United States Patent [19]
Reitmeier et al.

[11] 4,432,009
[45] Feb. 14, 1984

[54] VIDEO PRE-FILTERING IN PHANTOM RASTER GENERATING APPARATUS

[75] Inventors: Glenn A. Reitmeier, Trenton, N.J.; Christopher H. Strolle, Glenside, Pa.

[73] Assignee: RCA Corporation, New York, N.Y.

[21] Appl. No.: 305,171

[22] Filed: Sep. 24, 1981

[30] Foreign Application Priority Data

Mar. 24, 1981 [GB] United Kingdom ............... 8109253

[51] Int. Cl.³ .................................................. H04N 5/14
[52] U.S. Cl. ............................. 358/22; 358/140; 358/21 R; 358/37
[58] Field of Search ............... 358/22, 140, 11, 21 R, 358/37, 160, 166; 340/700, 798

[56] References Cited
U.S. PATENT DOCUMENTS 3,925,765 12/1975 Berwin et al. .................... 340/172.5
4,127,850 11/1978 Vallins .............................. 340/324 A

*Primary Examiner*—Michael A. Masinick
*Attorney, Agent, or Firm*—Joseph S. Tripoli; George E. Haas; Allen LeRoy Limberg

[57] ABSTRACT

Orthogonal Cartesian coordinates descriptive of the raster scanning of a television display screen are generated at a programmable skew angle to the Cartesian coordinates of an image stored in memory. Each of these generated coordinates has a number of more significant bits used to generate the column and row addresses for that memory, four spatially adjacent storage location of which are read from for developing each sample of video signal describing a rotated television image. Each of these generated coordinates has a number of less significant bits affording resolution higher than that with which the memory can be addressed, which are used for calculation of each video sample by two-dimensional interpolation between the read-outs from the four locations in memory. To avoid aliasing as the image is rotated, the digital video to be stored in memory is processed using two-dimensional spatial-frequency low-pass filters to reduce resolution in directions other than horizontal and vertical. Nonseparable two-dimensional filters with circular-or elliptical-cylindrical pass band shapes do this with minimal loss of image resolution.

28 Claims, 15 Drawing Figures

VIDEO PRE-FILTERING IN PHANTOM RASTER GENERATING APPARATUS

The invention relates to the programmable rotation of video display information using phantom raster generating apparatus and, more particularly, to pre-filtering of the video prior to its storage in the buffer memory of such apparatus.

Phantom raster representations are generated when display information in raster-scanned format is stored in a field storage buffer memory addressed during entry of data into it in the Cartesian coordinates of picture elements ("pixels", for short) in the raster scanning of the original display information, and subsequently addressed during data retrieval with Cartesian coordinates rotated with respect to those with which the memory was addressed at the time the data was being stored. Phantom raster generation using scan conversion of raster scan in x and y Cartesian coordinates to phantom raster scan in u and v Cartesian coordinates for skew-addressing a memory in which information was originally stored using x and y address coordinates is known, for instance, from U.S. Pat. No. 3,925,765 issued Dec. 9, 1975 to Berwin and Wilbur and entitled "DIGITAL RASTER ROTATOR".

Vallins in U.S. Pat. No. 4,127,850 issued Nov. 28, 1978 and entitled "SCANNING DISPLAY APPARATUS" describes the generation of skewed address coordinates by accumulating, at video rates, trigonometric functions of the display rotation angle. The skewed-addressing coordinates are generated with spatial resolution greater than that required for addressing locations in field storage memory, and the extra bits of resolution in the skewed-addressing coordinated are used to address read-only memory used for two-dimensional interpolation among four spatially adjacent data taken from field storage memory. Improved accumulation techniques for generating skew addresses have been devised in connection with the present invention, are described herein and in an application concurrently filed by Christopher H. Strolle entitled MEMORY SCANNING ADDRESS GENERATOR, and are claimed in that application.

The apparatus described by Vallins is only appropriate for use with displays in which the field storage memory stores artificial images that could be described using single-bit binary indications as to whether the display is or is not bright, insofar as a particular color is concerned, at each point in the display for which there is a corresponding addressable location in memory. Where the brightness information is encoded in a multiple-bit binary number defining a gray scale, as is the case with actual images generated from a camera, the four times replication of images in memory which characterizes the Vallins approach to storing them requires excessive image memory capacity. Further, the capacity requirements upon read-only memory for interpolation become excessive. Improved interpolation techniques which involve spatial multiplexing of image memory and arithmetic calculations using digital multipliers have been devised in an aspect of the present invention. Skewed-addressing of field storage memories storing a gray-scale information from actual images will result in noticable errors in the display when it is rotated, unless per an aspect of the present invention there is pre-filtering of the images to remove excessive spatial frequency content in directions askew from the horizontal and vertical axes of the unrotated image.

The digitized video information that is supplied to the field storage memory (or FSM) represents the display as a succession of pixels in a scan line followed by similar successions of pixels in succeeding scan lines. The vertical resolution is commonly defined in terms of scan lines per field; and the horizontal resolution, in terms of pixels per scan line. Vertical and horizontal resolution can be expressed in commensurate terms using the concept of "spatial frequency". Conventional frequency is more accurately defined as "temporal" frequency, the rate at which a function changes per unit time, expressable in cycles per second units. The rate at which a function changes as a function of distance is by analogy termed "spatial frequency" and is expressable in cycles per unit length (e.g., per meter). Normally, the horizontal spacing between pixel centers, which sets the upper limit on cycles per meter of picture intensity change possible in the horizontal direction, is chosen to afford nearly the same spatial frequency resolution as does the vertical spacing between adjacent scan lines on the display, which sets the upper limit on cycles per meter of picture intensity change possible in the vertical direction. For purposes of the present discussion assume these upper limits on available spatial frequency response to be equal. The resolution provided by conventional television signal in directions other than the horizontal and vertical directions is, then, known to those of skill in the art to be greater than the resolution in the horizontal and vertical directions—some $\sqrt{2}$ times greater at the 45° diagonal.

Consequently, an FSM that has storage locations defined by row and column addresses which conformally map pixel locations in the unrotated display will tend to contain information with resolution that is too high to be sampled at at least the Nyquist rate (i.e., twice the highest spatial frequency component in the signal in the direction of addressing) during the retrieval of digital video from the FSM using skewed addressing generated at normal pixel sampling intervals. This results in a folding over of the spatial frequencies exceeding Nyquist rate into the spatial frequency spectrum below Nyquist rate that can be satisfactorily sampled, generating spurious spatial frequencies below Nyquist rate. This type of phenomenon is called "aliasing".

Aliasing when retreiving data from the FSM by skew addressing can be avoided by simple one-dimensional spatial filtering of the display information in each of the horizontal and vertical directions, prior to its storage in the FSM. A low-pass filter with cut-off below Nyquist rate divided by $\sqrt{2}$ is used in each dimension, each of these filters normally being one which provides weighted averaging of spatially adjacent data.

A two-dimensional spatial filter constructed in this way has a response that is a product of individual responses of the cascaded one-dimensional spatial filters, and a filter with this response is referred to as one having a "separable" two-dimensional spatial frequency response. Such a filter reduces horizontal and vertical resolution of the image as referred to normal raster scan coordinates prior to phantom raster rotation. More attractive two-dimensional spatial filters exist in the class of filters having "non-separable" two-dimensional spatial-frequency response which cannot be expressed as the product of two one-dimensional filter responses. Of particular interest are those filters which have spatial frequency responses approximately a right circular or elliptic cylinder, with the base of the cylinder on the two-dimensional spatial-frequency plane and its height corresponding to the amplitude of response at each spatial frequency. These filters can reduce spatial resolution of the image in skew directions without reducing it in horizontal and vertical directions, before the image is stored in image memory and later possibly rotated by phantom raster scan techniques. The circular cylindrical response can achieve uniform spatial resolution where the pixels in the image have similar horizontal and vertical dimensions; and the elliptic cylindrical response can remove excessive skew direction resolution where the pixels in the image have non-uniform horizontal and vertical dimensions, as is the case with the "images" in the luminance and chrominance components of conventional broadcast television signals.

Another problem encountered when using phantom raster displays is that the data sample points in the original video signal, conformally mapped by the storage locations in the FSM showing similar row and column addresses, are not conformally mapped by the skew addresses generated by scan conversion. This problem can be alleviated by sampling at rates much higher than Nyquist rate and using a memory with sufficient number of storage locations to store these samples as a more densely packed assemblage of sample points conformally mapping the display. This solution entails several-fold greater memory capacity than that required for accommodating higher diagonal resolution and is too costly to be practical.

The invention in its various aspects is embodied in apparatus for generating phantom raster from frame-storage or field-storage memory with storage locations storing spatial frequency sample points of the display at sampling densities which do not appreciably exceed actual display resolution. A first aspect of the invention is the use of two-dimensional spatial-filtering of digitized video prior to its storage in frame-storage or field-storage memory. In preferred embodiments of the invention, this spatial-filtering is done using cylindrical spatial-frequency response to reduce the diagonal resolution of the image being stored without having to simultaneously reduce horizontal or vertical resolution. Then when the memory is raster-scanned with skewed addressing during retrieval of the information stored therein, there will be no spatial frequencies in the stored data sufficiently high that aliasing will occur. These skew addresses are generated with high spatial resolution, greater than that provided by addressable locations in memory. Modular, or integral portions of these addresses (their moduli) are used to access storage locations in memory corresponding to spatial locations closest to the point in space exactly specified by the complete addresses. Residual, or fractional, portions of these addresses (their residues) are used to govern a two-dimensional interpolation among the data retrieved from those storage locations to obtain each of the successive samples of video signal descriptive of rotated display. A second aspect of the invention is the carrying forward of the two-dimensional interpolation so as to avoid the need for large-capacity read-only memory, by performing linear interpolations between two pairs of the data taken from memory during generation of each successive sample of video signal and subsequently performing a linear interpolation between the results of the earlier linear interpolations.

Figure 4:
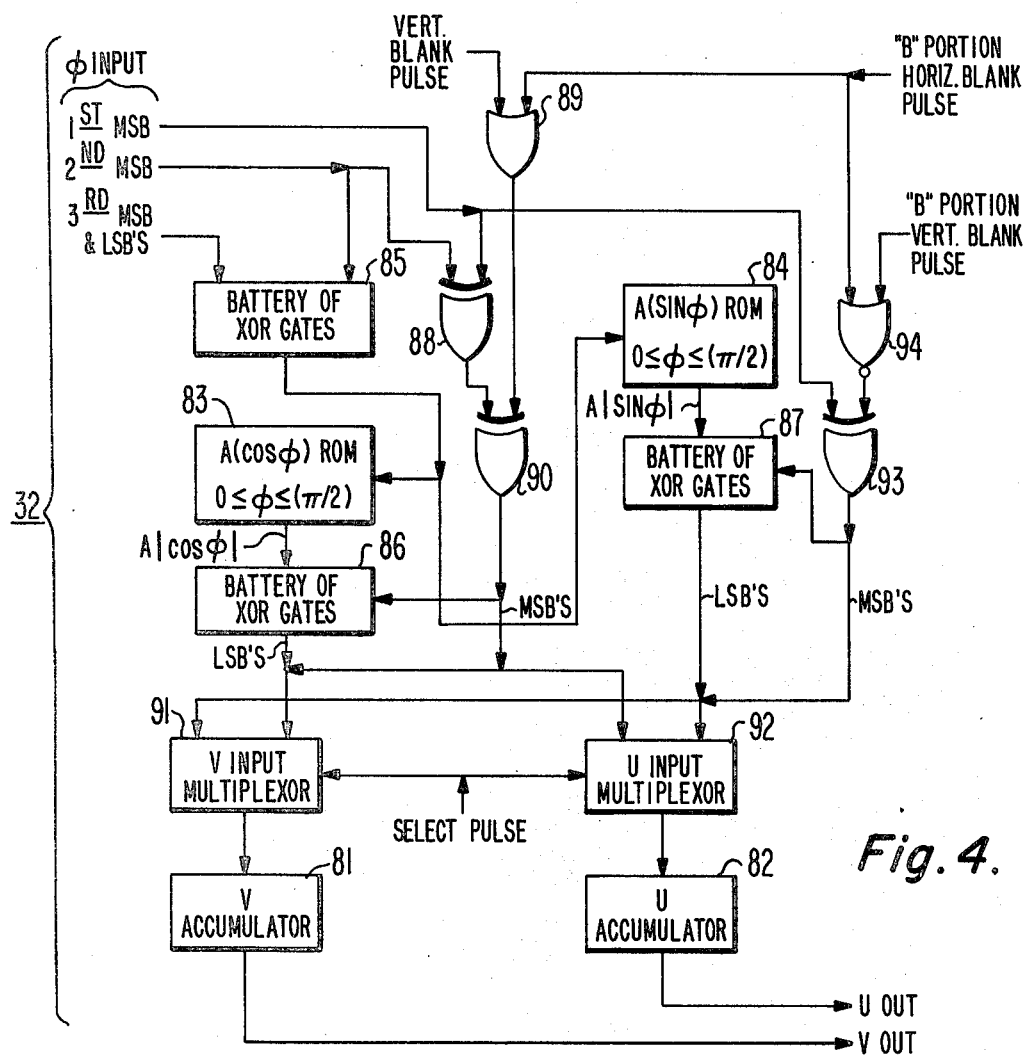
Figure 5:
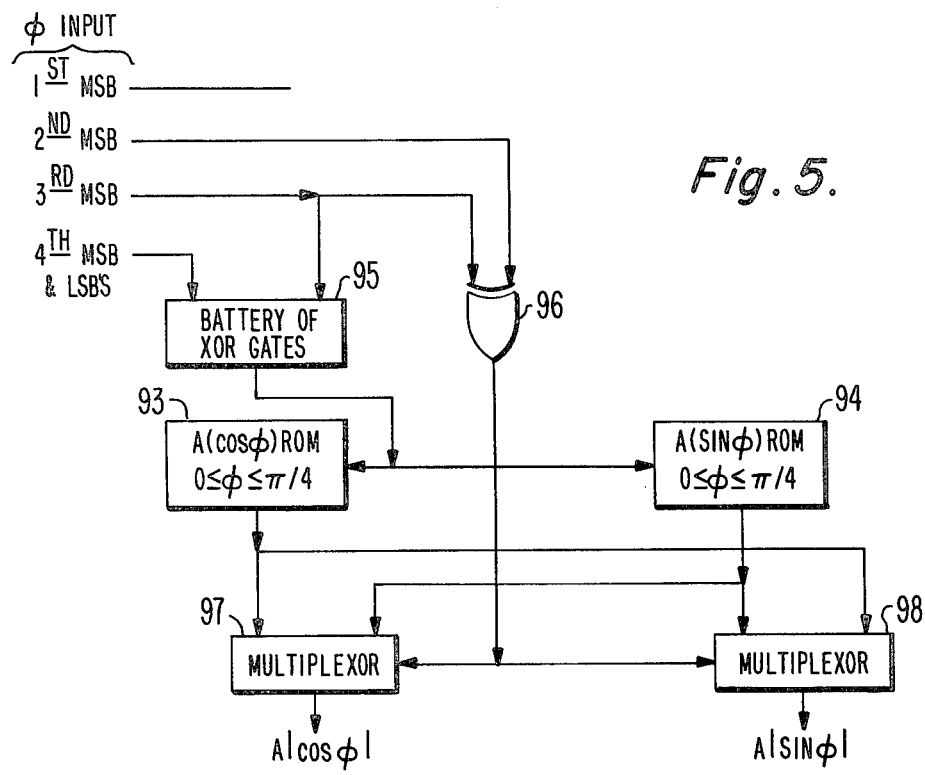
Figure 7:
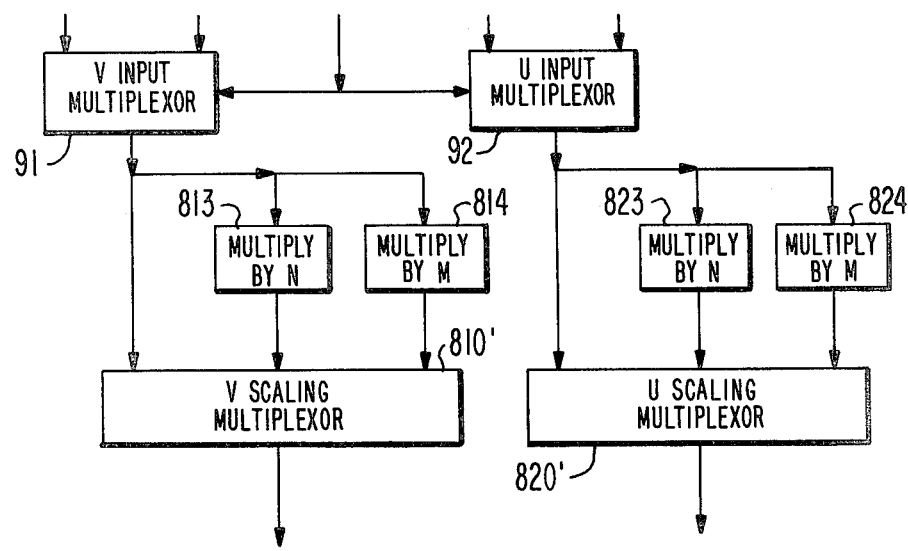
Figure 6:
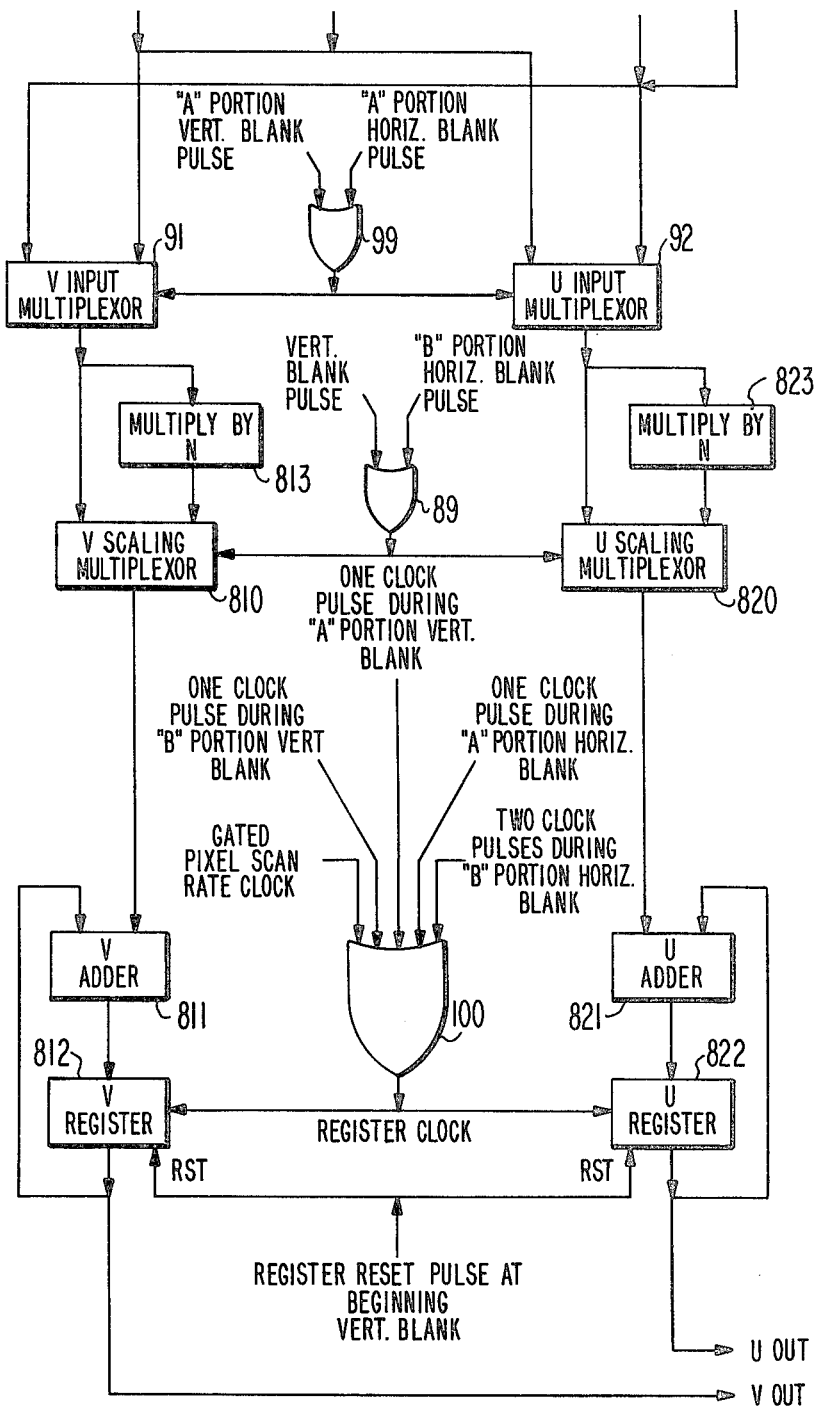
Figure 8:
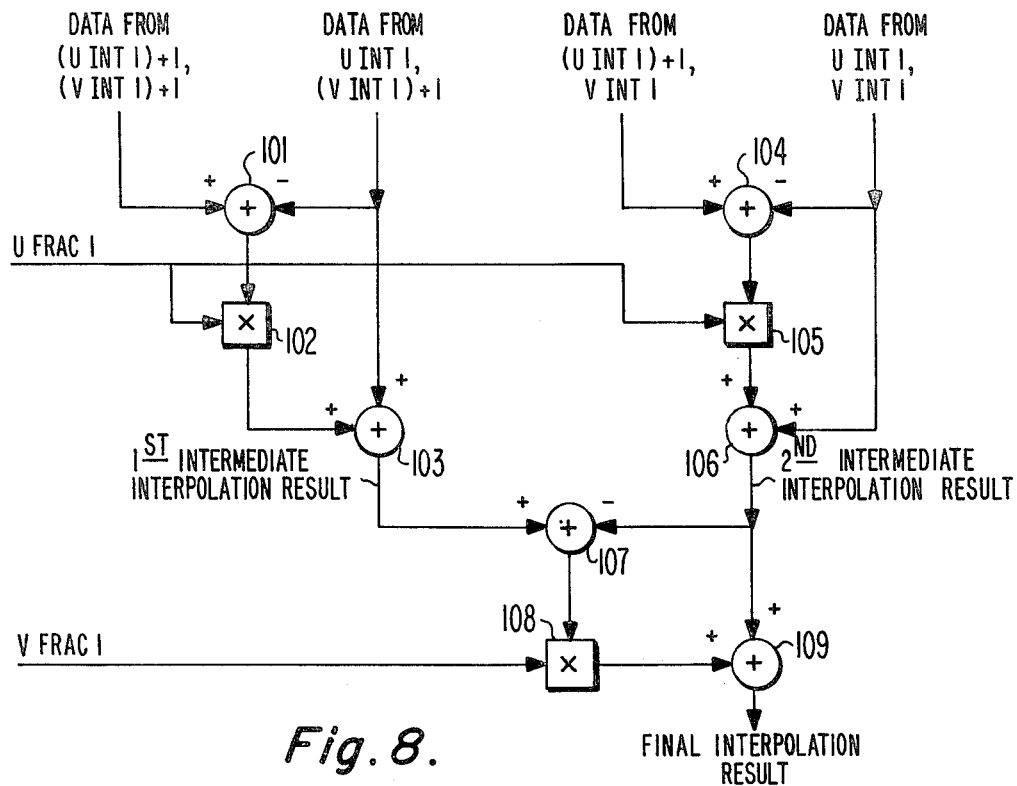
Figure 9:
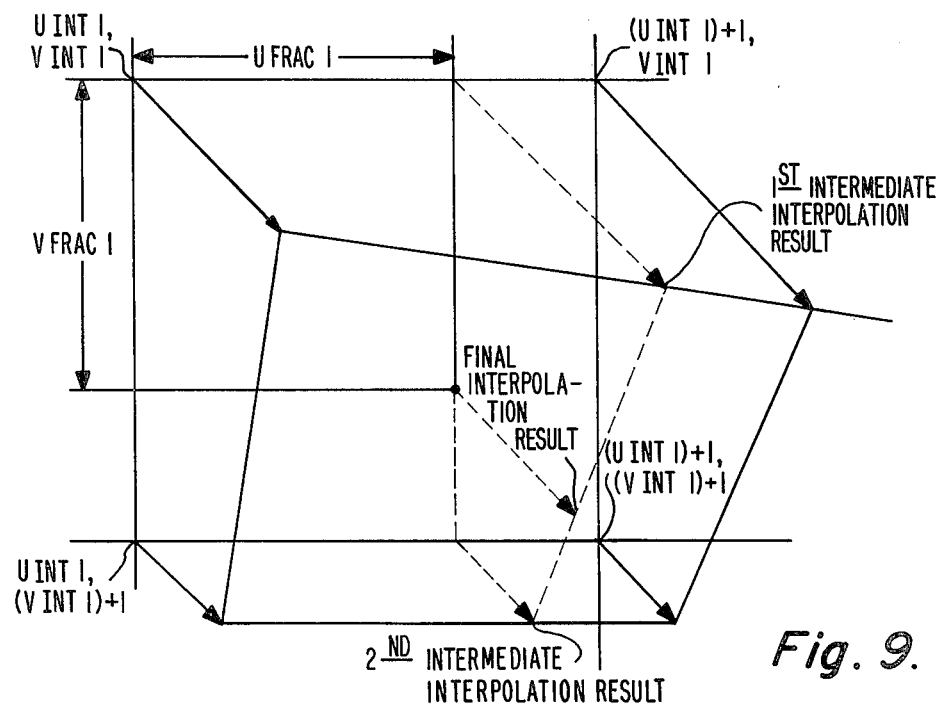
Figure 10:
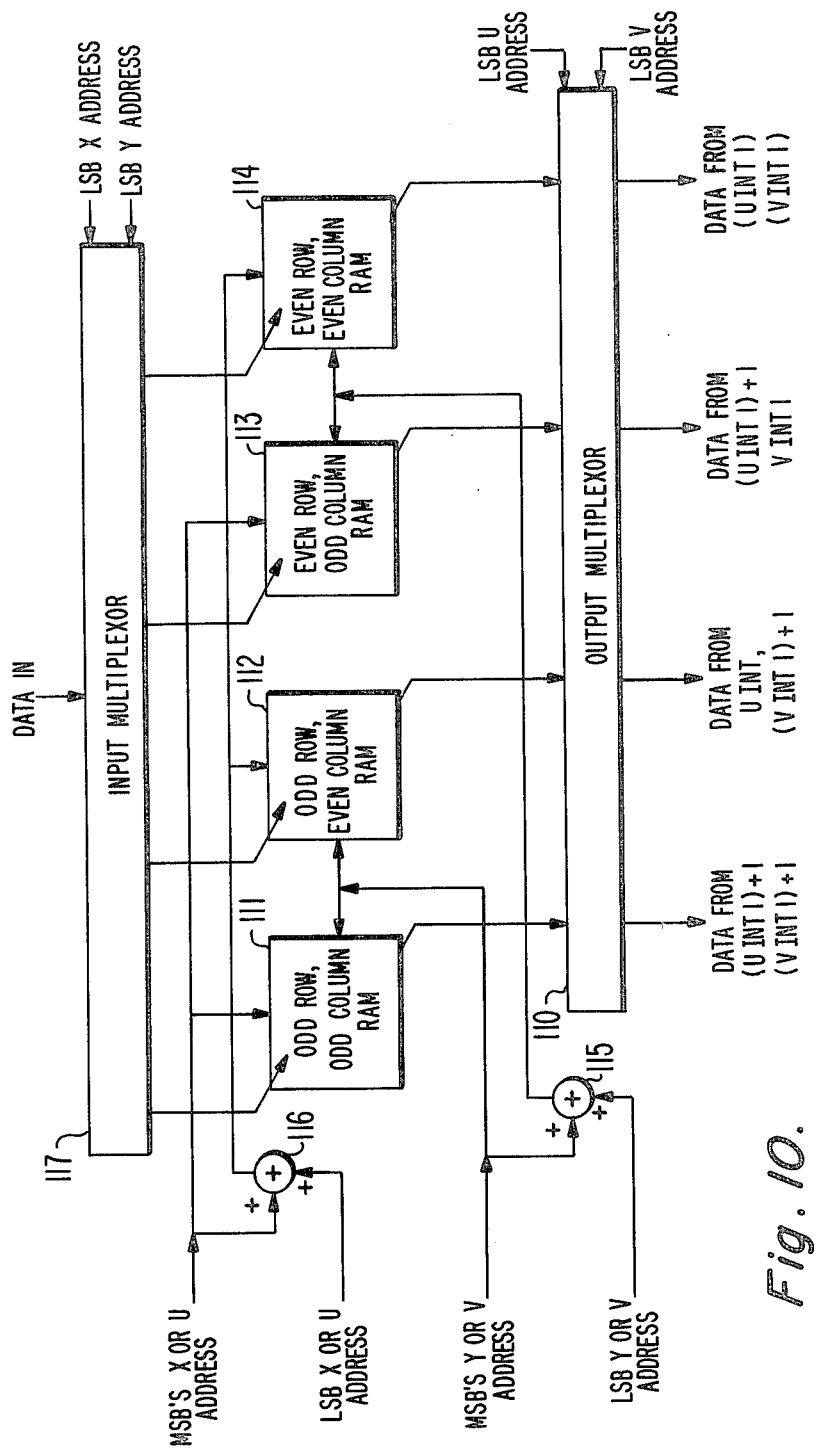
Figure 11:
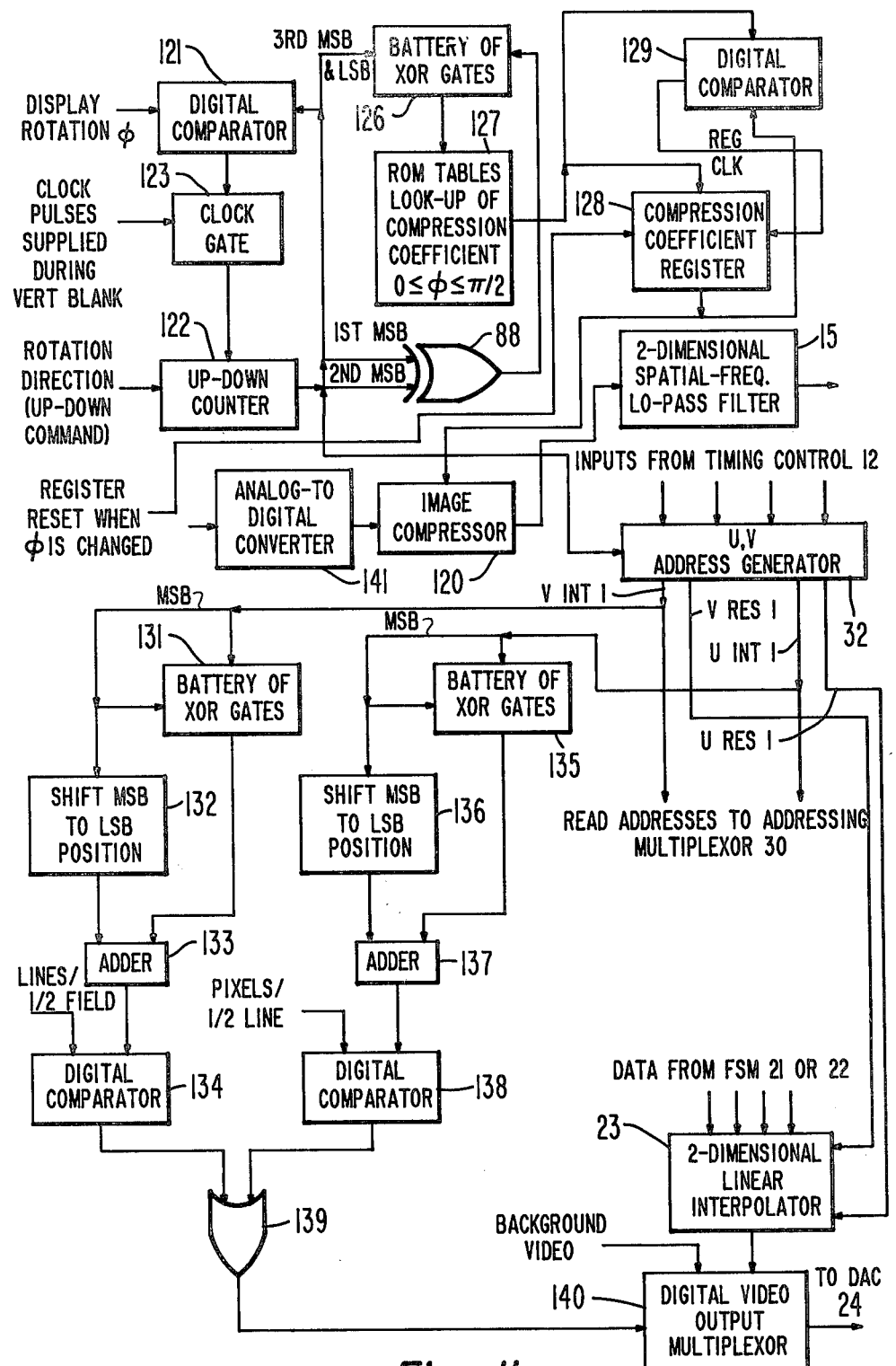
Figure 12:
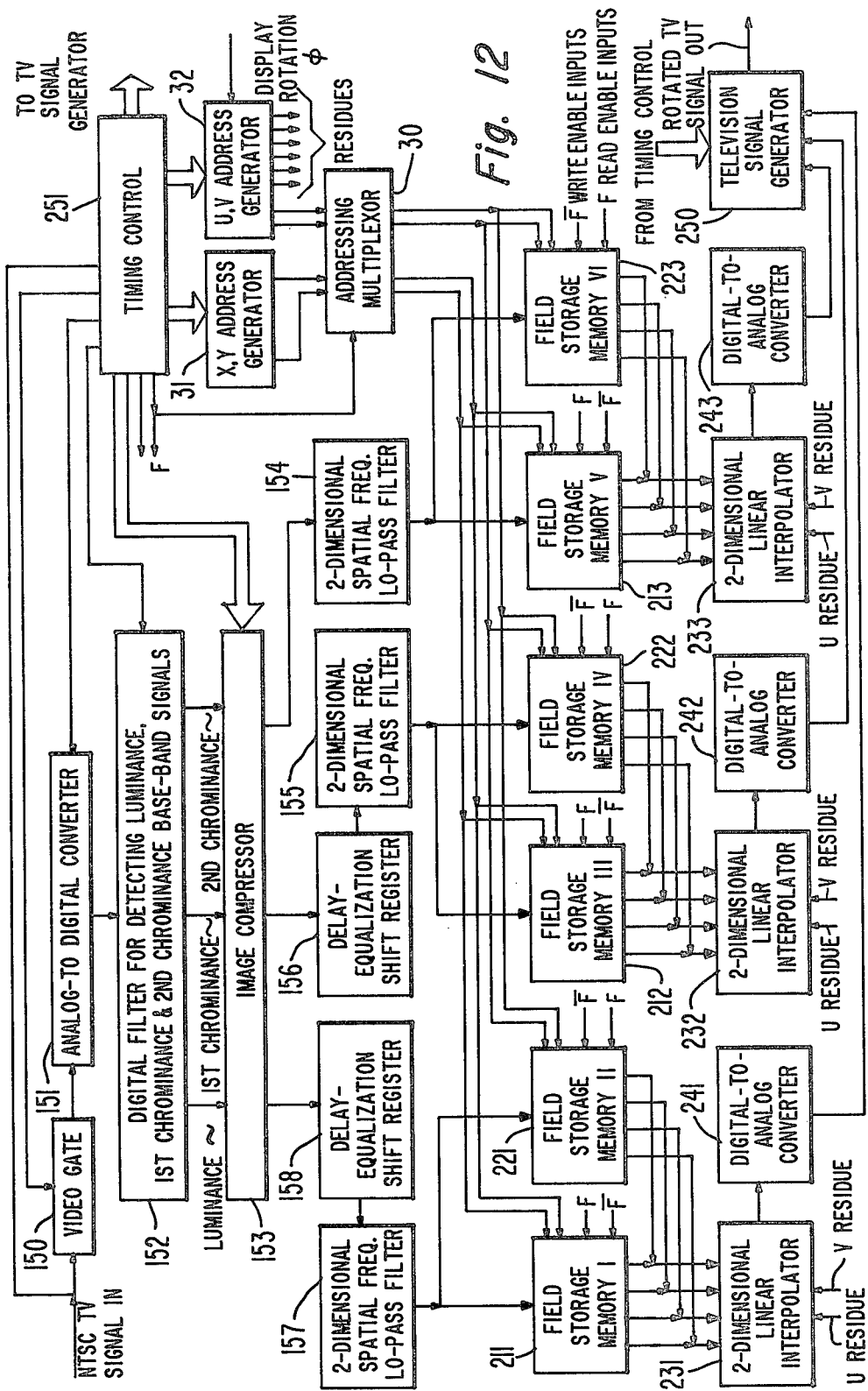
Figure 13:
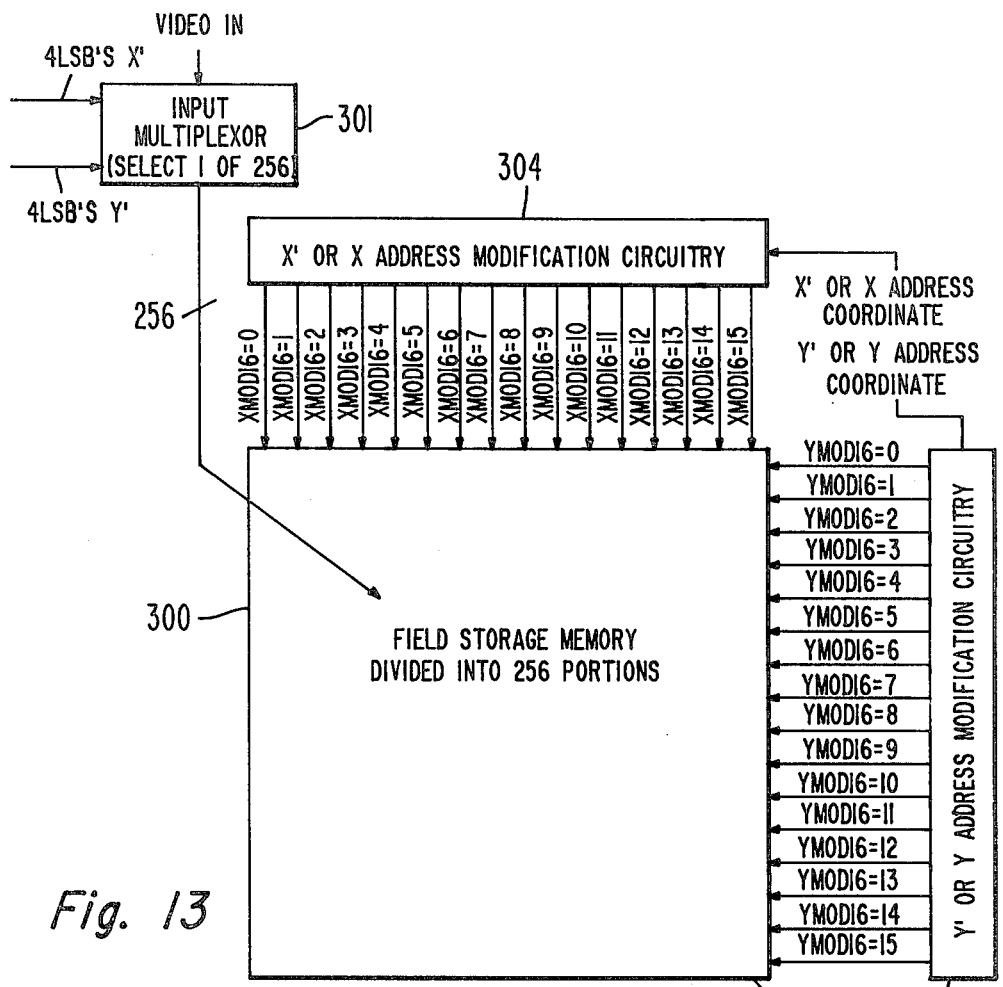
Figure 14:
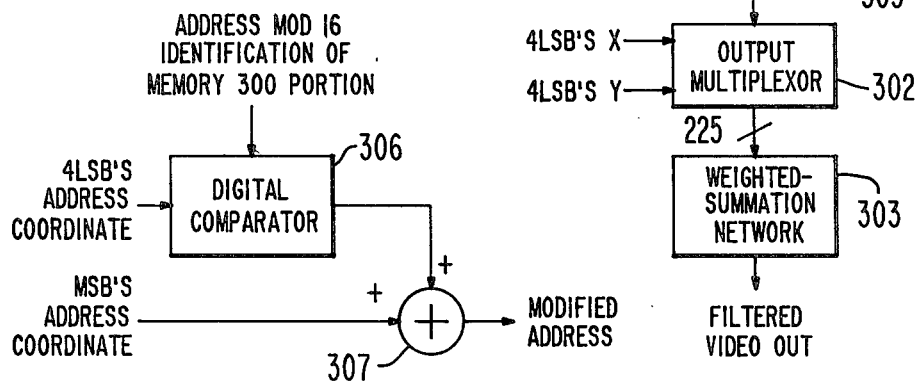

FIG. 4 is a block diagram of a read address generator for generating at video rates programmably-skewed phantom-raster-scanned read addresses for the field storage memory from which display information is taken, the skewed read addresses being generated by accumulation techniques that permit high resolution read addresses to be generated without need for data rates many times higher than video rate;

FIG. 5 is a block diagram of a modification of the read address generator of FIG. 4;

FIG. 6 is a block showing in still further detail circuitry of the read address generator of FIG. 4 or of FIG. 4 as modified per FIG. 5;

FIG. 7 is a block diagram of a modification of the FIG. 6 circuitry;

FIG. 8 is a block diagram showing the two-dimensional linear interpolator in greater detail;

FIG. 9 is a graph useful in understanding the nature of two-dimensional linear interpolation;

FIG. 10 is a block diagram showing an organization of the field storage memory which permits four storage locations to be read out in parallel to the two-dimensional linear interpolator;

FIG. 11 is a block diagram of apparatus for adjusting against memory overscan;

FIG. 12 is a block diagram of apparatus for generating polychromatic phantom raster display presentations in accordance with the invention;

FIG. 13 is a block diagram of another novel two-dimensional spatial frequency low-pass filter useful in practicing the invention in broadcast television studio apparatus;

FIG. 14 is a block diagram of a detail of the FIG. 13 filter; and

Figure 2:
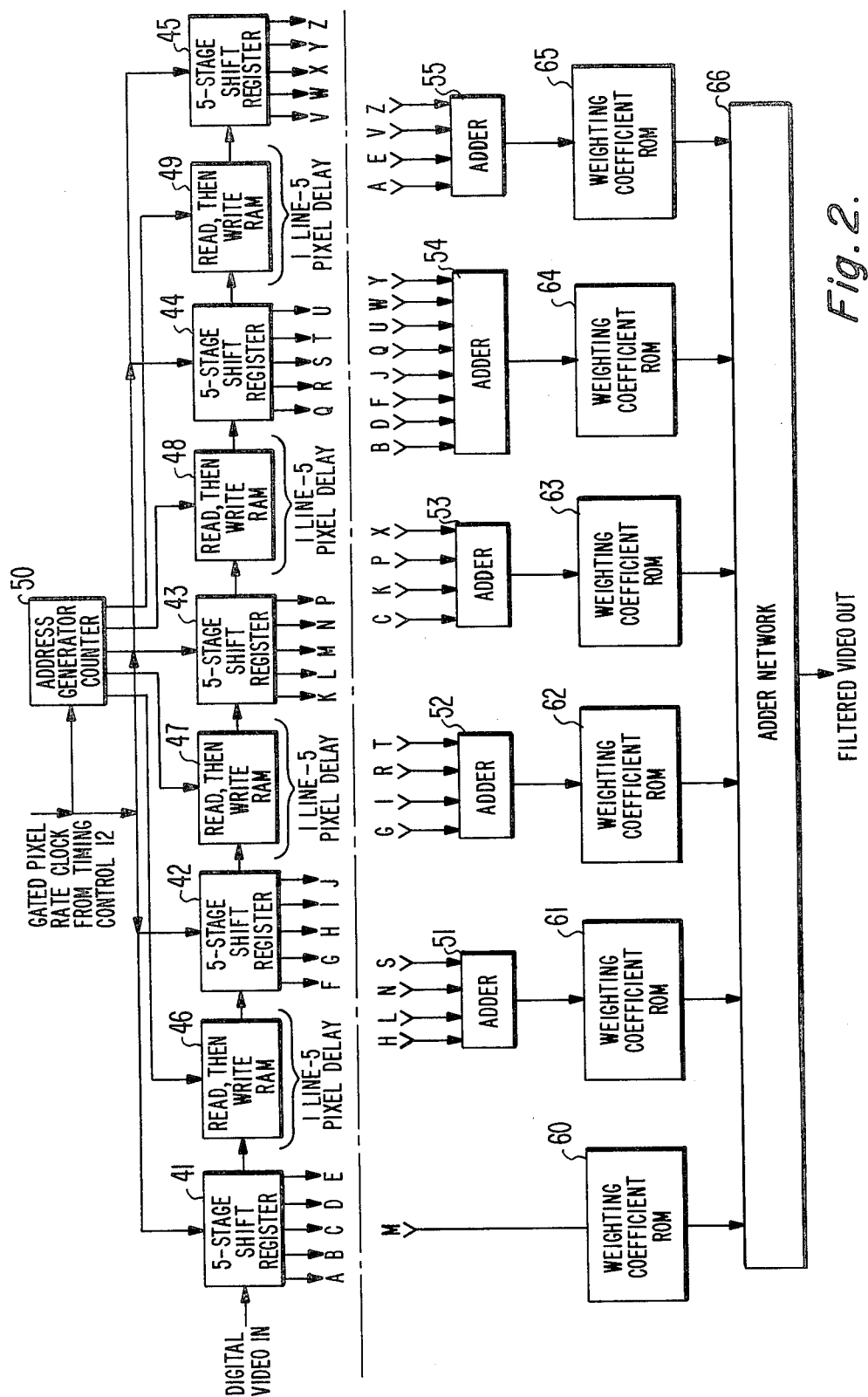
FIG. 2 is a block diagram showing the novel low-pass filter in greater detail.
Figure 15:
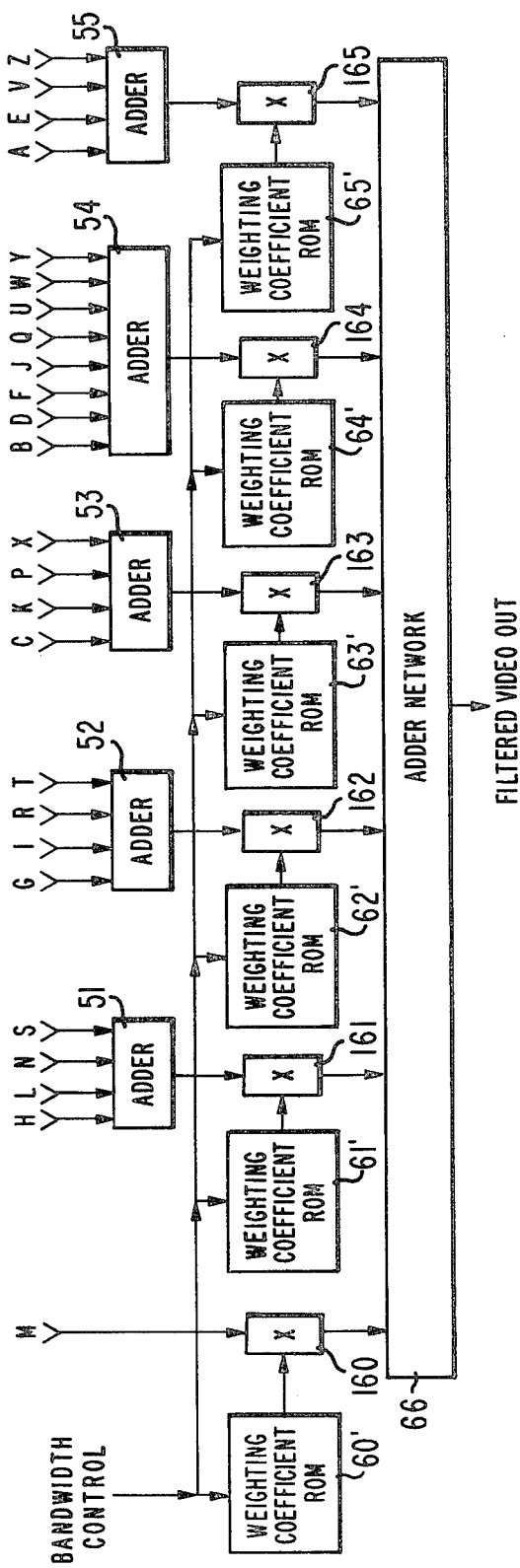

FIG. 15 is a block diagram of a modification of the FIG. 2 low-pass filter, which permits its bandwidth to be electrically controlled.

Figure 1:
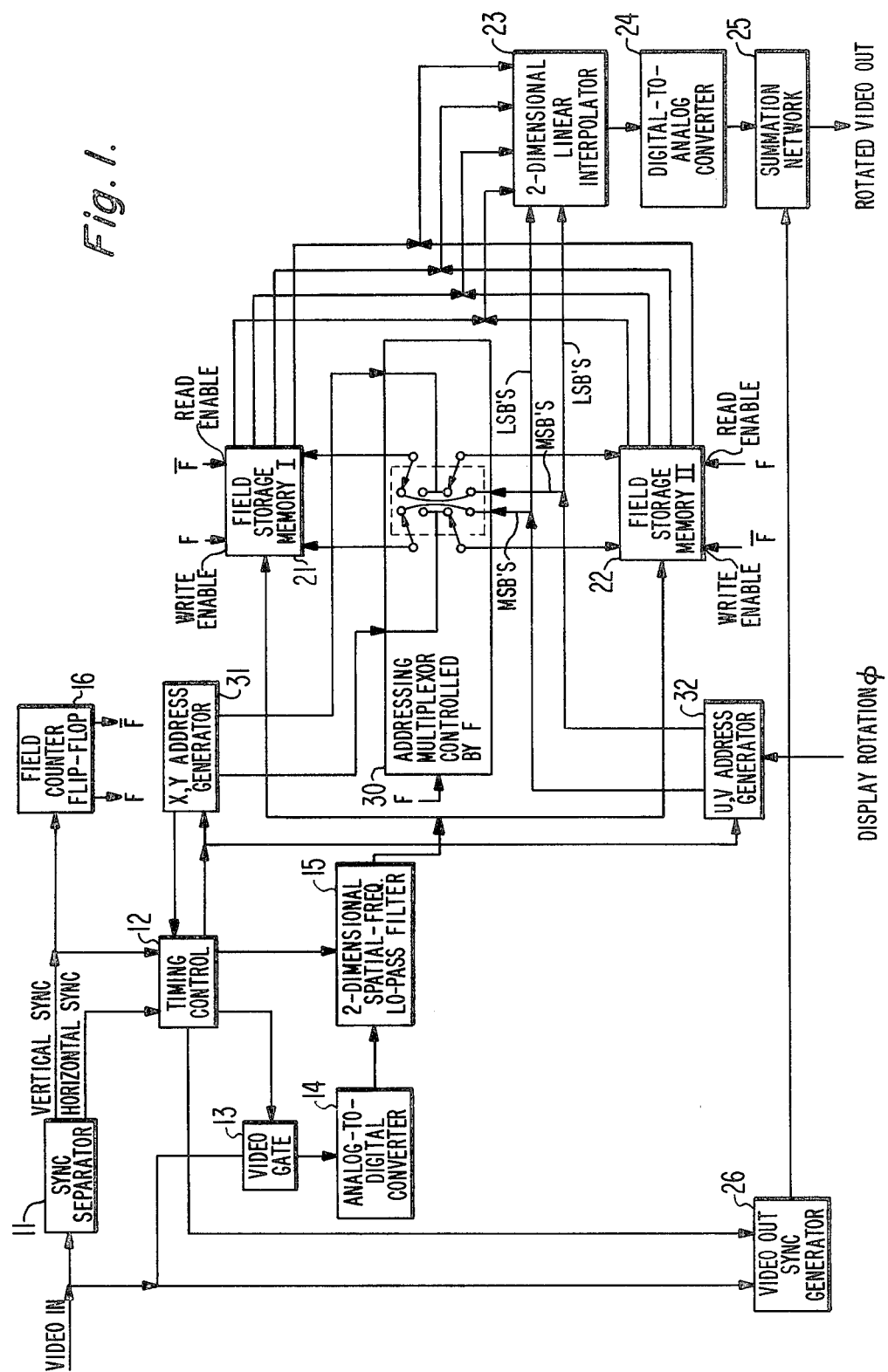
FIG. 1 is a block diagram of apparatus for generating monochromatic phantom raster display presentations, which embodies various aspects of the present invention and includes a two-dimensional spatial-frequency low-pass filter and a two-dimensional linear interpolator.

The FIG. 1 phantom-raster-generating apparatus video input signal is applied to a sync separator 11 which separates the horizontal and vertical sync pulses from the video input signal and supplies it to timing control circuitry 12. This circuitry includes a master clock generator synchronized to a multiple of the horizontal sync signal fundamental frequency, this being done with an automatic frequency and phase control (AFPC) system. Timing control circuitry 12 also includes frequency divider circuitry from which timing control output signals are taken.

A first of these timing control output signals indicates when the horizontal or vertical sync blocks occur and is applied as a control input to a video gate 13. Gate 13 responds to pass only the picture-interval portions of the video input signal to the input of an analog-to-digital converter 14, which digitizes the video information. The resulting stream of digital data is shown applied to the input of a two-dimensional spatial-frequency low-pass filter 15, of a type to be described in detail later on in connection with FIG. 2, which filter modifies the image so its resolution is substantially equal in all directions to its former horizontal and vertical resolution.

Vertical sync pulses from sync separator 11 are applied as triggering signal to a triggered flip-flop 16 which counts the video display fields modulo two. Output $\overline{F}$ from flip-flop 16 when high provides a WRITE ENABLE signal to a first field storage memory 21 and a READ ENABLE signal to a second field storage memory 22. Output F from flip-flop 16, complementary to output $\overline{F}$, when high provides a WRITE ENABLE signal to FMS 22 and a READ ENABLE signal to FMS 21. During every other field, FMS 21 is conditioned to receive data from filter 15 for storage during its write cycle, while FMS 22 is conditioned to deliver data during its read cycle to interpolator 23. During the intervening fields, FMS 22 is conditioned to receive data from filter 15 for storage, while FMS 21 is conditioned to deliver data to interpolator 23.

Interpolator 23 output is converted to analog form in digital-to-analog converter 24, and the analog video has sync information reinserted in summation network 25 to supply video output information. The re-inserted sync information is supplied from a sync generator 26 in a timing controlled by a second timing control signal from timing control circuitry 12. Sync generator 26 may actually generate new sync information, or (assuming the alternate field scans not to be interleaved as to line scan) it may simply strip old sync information from the video input signal and forward it to summation network 25.

An addressing multiplexor 30 responds to F or $\overline{F}$ or both to selectively apply the Cartesian coordinates x and y from an x, y address generator 31 as WRITE addressing to the one of FMS's 21 and 22 provided with WRITE ENABLE from flip-flop 16. At the same time multiplexor 30 selectively applies the modulus portions of Cartesian coordinates u and v from a u, v address generator 32 as READ addressing to the other of the FMS's 21 and 22, the one provided with READ ENABLE from flip-flop 16. The basic equivalent circuit of the switching by the addressing multiplexor is sketched within the block 30 to aid understanding of the nature of the switching the multiplexor does, although in actuality the multiplexor uses electronic switching, of course.

The x and y Cartesian coordinates generated by address generator 31 are along axes respectively parallel to and perpendicular to the direction of line scan in the unrotated display. In this specification the positive directions along the x and y colordinate axes will be assumed to extend to the right of the display scan as viewed from the front and to extend downwards, respectively; and clockwise rotation will be considered to be positive, departing from conventional right-hand coordinate system in favor of the left-hand coordinate system more customarily used for describing television systems that scan from left to right. That is, a vector positively directed along the x axis thereafter rotated clockwise +90° will be positively directed along the y axis. As will be discussed in more detail further on in the specification, it is convenient to generate the x and y coordinates in two's complement form with their zero values defining the center of rotation of the stored display information.

The u and v Cartesian coordinates generated by address generator 32 are orthogonal to each other, a vector positively directed along the u axis thereafter rotated +90° being redirected to be positively directed along the v axis. Display rotation angle, $\phi$, information is supplied to address generator 32 to program the rotation angle $\phi$ between the coordinate systems—that is, between the x and u axes and between the y and v axes. The well-known equations describing the transformation between coordinate systems are as follows:

$$u = A(x \cos \phi + Y \sin \phi) \tag{1}$$

$$v = A(-x \sin \phi + Y \cos \phi) \tag{2}$$

The factor A is a positive scaling constant, which can be altered to zoom the phantom raster presentations and will generally be somewhat more than unity where the phantom raster is to slightly overscan the original, unrotated image. The x and y coordinates are presumed to be always integral in value; so except for special values of $\phi$, the u and v coordinates will be non-integral in value. The more significant bits of each of the u and v coordinates that define its integral value will be referred to in this specification as the "modulus" of the coordinate, and the less significant bits that define its fractional value, as the "residue" of the coordinate, unless otherwise specified. The moduli of the u and v coordinates are used as the READ addresses of FSM's 21 and 22. The residues of the u and v coordinates are supplied to the two-dimensional linear interpolator 23 to control the interpolation between the four digital data read out of the selected FSM 21 or 22, as will be explained in detail later in this specification.

FIG. 2 shows how the two-dimensional spatial-frequency low-pass filter 15 may be constructed. Filter 15 develops a weighted average of the video amplitude at each pixel in the raster-scanned display information with other pixels located in a region of the display centered at that pixel. The particular two-dimensional filter shown in FIG. 2 operates over a square region that includes twenty-five pixels and has horizontal and vertical sides, assuming an upright display screen raster-scanned from left to right and from top to bottom. This is the smallest rectangular array of pixels for which a two-dimensional spatial-frequency low-pass filter characteristic that is a reasonably good approximation to a cylindrical pass band can be obtained, and is described by way of illustration of how the general class of these filters (which class includes members which work over larger arrays of pixels) works.

The portion of the filter above the line of intermittently long and short dashes is a tapped delay line. It is, in effect, a shift register four lines and five pixels in length, which shift register shifts digitized video received at left and stores in selected positions along its length the twenty-five pixels from which the weighted average is compared. Practically, it is simpler to simulate this very long shift register using a cascade connection of five five-stage shift registers 41, 42, 43, 44, 45 interspersed with digital delay lines 46, 47, 48, 49. Each of these digital delay lines provides a delay five pixels shorter than a scan line; and a practical way of implementing each of them is with a random access memory (RAM) arranged for read-and-then-write operation and supplied at pixel scan rate with a continuous loop of successive addresses by an address generator 50, which simply comprises a counter for gated pixel scan rate clock pulses from timing control 12. The twenty-five sample points provided from the tapped delay line are labelled with the letters of the alphabet excluding O.

Generally speaking, in this type of two-dimensional low-pass filter each of these sample points is weighted—that is, multiplied by a weighting coefficient—and the results are then summed. But, where a low-pass filter characteristic of circular cylinder form is sought, and where the spatial-frequency resolution is similar along the scan line and perpendicular to it, advantage can be taken of the resulting octantal symmetry to sum the digital data from pixels equidistant from the center of the pixel array prior to weighting and final summing. This preliminary summing is done by adders 51, 52, 53, 54, 55 in FIG. 2, the central pixel in the array taken from output M of shifter register 43 having no other point at equal distance from the center of the pixel array to be summed with. The weighting can then be carried forward by only six read only memories (ROM's) 60, 61, 62, 63, 64, 65 to suitably weight the central pixel data and data from the outputs of address 51, 52, 53, 54, 55.

The weighted data are then finally summed in adder network 66. The weighting of all six inputs to adder network 66 permits normalization of adder network 66 output. Where such normalization or gain-scaling is unnecessary, one of the weighting ROM's 60, 61, 62, 63, 64, 65 can be dispensed with, the data formerly applied to its input being applied directly to an input of adder network 66. It is perhaps most convenient to dispense with ROM 64, since it has to have more bits in its input to accommodate the tendency for adder 54 output to be larger than that of adders 51, 52, 53 and 55 by reason of the larger number of inputs to that adder.

The process by which appropriate weighting coefficients can be derived will now be described. The design goal is to build a two-dimensional spatial-frequency filter through which digital samples of video amplitude can be passed, such that the resolution of the picture will be the same in all directions from any point in the two-dimensional (in space) field of video amplitude. This filter is constructed using weighting of sample points in two-dimensional space according to a spatial-domain function which is the linear transform of the spatial-frequency-domain function describing the desired filter response. ("Spatial domain" and "spatial-frequency domain" as used in reference to functions of space respectively correspond to the terms "time-domain" and "frequency-domain" as used in reference to functions of time.) Now, considering the spatial-frequency-domain response of the filter, for there to be equal resolution in all directions, there should be uniform low-pass spatial-frequency response as a function of $R = [(X/a)^2 + (Y/b)^2]^{\frac{1}{2}}$ radial coordinate. Here R, (X/a), and (X/b) are radial, horizontal and vertical distances in the spatial-frequency domain, respectively, referred to common units. That is, the gradient of video amplitude as a function of distance should be constrained by the filter to the same maximum in all directions.

The spatial-domain response of this filter to a unit impulse, of rectangular area in the spatial-frequency domain, a pulse approaching infinite amplitude as its dimensions in the directions of X and Y approach zero, when put through a convolution process with the image-descriptive waveform as a function of the two dimensions of space, yields the desired spatially filtered image data. The weighted summation of the tapped delay line outputs, A to Z excluding O, is a finite representation of the significant terms of such a convolution process carried out with integration being done on a sampled-data rather than continuous basis. That is, convolution is a summation, rather than a continuous integral.

A convenient, theoretical two-dimensional spatial-frequency response for the low-pass filter is a unit-height cylindrical pass band of unit diameter, the dimension of diameter of the circular cylinder being in terms of the reciprocal of twice the distance between centers of pixels adjacent to each other in horizontal or vertical direction. The unit-impulse response of such a filter is $[J_1(R)]/R$, where $J_1(R)$ is a Bessel function of the first kind in R. The $[J_1(R)]/R$ function will then describe the envelope of the weights to be applied in the "bed-of-nails" spatial-filtering associated with data sampling of the two-dimensional spatial field of video amplitude, in order to carry forward the convolution of the $[J_1(R)]/R$ function with the sampled two-dimensional spatial field of video amplitude, over their ranges where significant contributions are made to the convolution summation. The truncation of the convolution process will involve some departure from unity of zero-spatial-frequency filter response, and the weighting coefficients can be scaled to regain unity response at zero spatial frequency. Assume the tapped delay line outputs to be arranged in a matrix of the following form.

| A | B | C | D | E |
|---|---|---|---|---|
| F | G | H | I | J |
| K | L | M | N | P |
| Q | R | S | T | U |
| V | W | X | Y | Z |

Then the matrix of weighting coefficients, respective elements of which are used to multiply respective elements of this matrix having the same position in matrix, will have the following values, assuming the low pass filter to have unity diameter cylindrical pass-band and to have zero-spatial-frequency gain normalized to unity.

| .03977 | .00616 | −.04943 | .00616 | .03977 |
|---|---|---|---|---|
| .00616 | −.07653 | .13089 | −.07653 | .00616 |
| −.04943 | .13089 | .77190 | .13089 | −.04943 |
| .00616 | −.07653 | .13089 | −.07653 | .00616 |
| .03977 | .00616 | −.04943 | .00616 | .03977 |

Viewing the weighting coefficients in the immediately preceding matrix one will note the coefficients exhibit quadrantal symmetry (the quadrants being defined by horizontal and vertical axes through the middle coefficient in the table, assuming the page to be viewed while held upright in the vertical plane). This is characteristic of a class these two-dimensional spatial frequency low-pass filters, since they have circular passband characteristics in X/a, Y/b coordinates and thus circular or elliptic pass-band characteristics in X, Y coordinates. But further, since the system described by FIGS. 1 and 2 was assumed to have equal vertical resolution in meters/scan line and horizontal resolution in meters/pixel, a=b, so the special case of the pass-band being circular in X,Y coordinates as well as (X/a), (Y/b) coodinates obtain. This results in the octantal symmetry observable in this array of coefficients. Whether octantal or just quadrantal symmetry obtains, this symmetry can be exploited by summing the shift register outputs (i.e., sample point data) to be multiplied by the same weighting coefficient before the multiplications take place, so a single multiplier (e.g., ROM G1,G2,G3,G4 or G5) can perform all the multiplications, taking advantage of the commutative and associative laws of conventional arithmetic.

Figure 3:
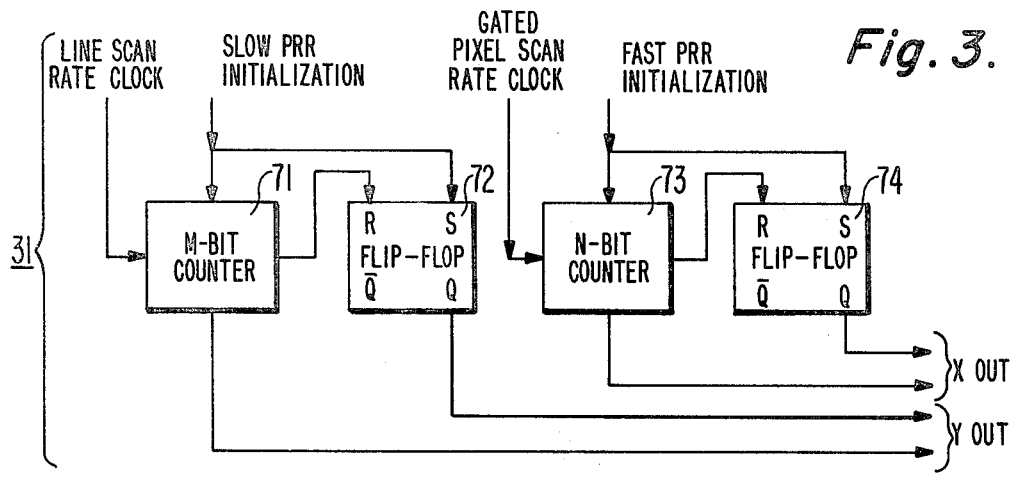
FIG. 3 is a block diagram of a write address generator for generating at video rates the raster-scanned write address for field storage memory.

A preferred form of the x, y address generator 31 shown in greater detail in FIG. 3 generates x and y spatial-domain Cartesian coordinates in two's complement form to facilitate signed arithmetic. In certain industrial and military television applications it is convenient to use a raster-scanned display with $2^{(m+1)}$ active lines each with $2^{(n+1)}$ pixels, m and n each being a respective integer, usually 7, 8 or 9. A square aspect ratio, where m=n, is convenient to use in applications where rotation of display is frequently called for; and this type of television system will be specifically considered in this specification in connection with FIGS. 3,4,5,6,8, 9 and 10.

The y coordinate of raster scan is generated in two's complement form using an m-bit counter 71 and a set-reset flip-flop 72, its most significant bit being provided by the Q output of flip-flop 72 and its less significant bits by counter 71 output. The output of coverter 71 is set to ZERO and the Q output of flip-flop 72 is set to ONE by a SLOW PRR INITIALIZATION PULSE generated in timing control circuitry 12 at the upper left corner of the unrotated raster. ("PRR" is the abbreviation for "pulse repetition rate".) The count in counter 71 is incremented by a LINE-SCAN-RATE pulse furnished to it from timing control circuitry 12 each horizontal blanking interval. Just prior to the center of the display being reached by line scanning, the m-bit counter 71 will have counted $2^m$ scan lines and have reached full count. The next LINE-SCAN-RATE CLOCK pulse input will cause the counter 71 output to change from m parallel bits each ONE to m parallel bits each ZERO and to reset flip-flop 72. When being reset, flip-flop 72 toggles from ONE to ZERO at its Q output; and its Q output remains at ZERO as the remainder of the field is scanned.

The x coordinate of scan is generated using a n-bit counter 73 and a set-reset flip-flop 74; their combined outputs provide the x coordinate in two's complement form, its most significant bit being provided by the Q output of flip-flop 74 and its less significant bits, by counter 73 output. The output of counter 73 is reset to ZERO and the Q output of flip-flop 74 is set to ONE by a FAST-PRR INITIALIZATION pulse generated by timing control circuitry 12 during horizontal blanking. The count in counter 73 is incremented at video rate by PIXEL-SCAN-RATE CLOCK pulses furnished from timing control circuitry 12 except during horizontal blanking and during vertical blanking. Just one pixel before the center of the line being scanned has been reached, the n-bit counter 73 will have counted $2^n$ pixels and have reached full count. The next PIXEL-SCAN-RATE CLOCK pulse input will cause the counter 73 output to change from n parallel bits each ONE to n parallel bits each ZERO and to reset flip flop 74 with its overflow bit. The Q output from flip flop 74 toggles from ONE to ZERO and remains at ZERO for the remainder of the time scan.

The types of circuitry that can be used in timing control circuitry 12 for generating the LINE-SCAN-RATE CLOCK, SLOW-PRR INITIALIZATION, PIXEL-SCAN-RATE CLOCK and FAST-PRR INITIALIZATION pulses are familiar to the video system designer. The PIXEL-SCAN-RATE CLOCK and LINE-SCAN-RATE CLOCK pulses are normally generated by frequency-dividing counters which count pulses from a master clock generator—although often (particularly in systems with monochromatic display) the master clock supplies output pulses at pixel scan rate, which are supplied without frequency division to counter 73 as input for counting. The SLOW-PRR INITIALIZATION and FAST-PRR INITIALIZATION pulses may be provided by separated vertical and horizontal synchronizing pulses, respectively.

A peferred form the the u, v address generator 32 is shown in detail in FIG. 4 and includes a pair of accumulators 81 and 82 for accumulating u and v, respectively. These accumulators are clocked every time a PIXEL SCAN RATE CLOCK pulse occurs to accumulate $\Delta x \cos \phi$ and $-\Delta x \sin \phi$ terms, each multiplied by a scaling factor A. They are also clocked every time a HORIZONTAL BLANKING pulse occurs to accumulate $\Delta y \sin \phi$ and $\Delta y \cos \phi$ terms, each multiplied by A. That is, scan conversion of x and y Cartesian coordinates to u and v Cartesian coordinates, the latter rotated by an angle $\phi$ from the former, is carried forward using accumulation algorithims based on formulas (1) and (2) appearing earlier in the specification. The accumulation of the $\Delta x \sin \phi$ and $\Delta x \cos \phi$ terms, each multiplied by A, during horizontal retrace and the initialization of accumulators 81 and 82 involve further intricacies explained later on in the specification.

The magnitudes of $A \cos \phi$ and $A \sin \phi$ are obtained from ROM's 83 and 84, respectively, responsive to the thirdmost and less significant bits of the programmed display rotation angle $\phi$ in its first and third quadrants and responsive to the complement of those bits in the second and fourth quadrants of $\phi$. This is arranged for by supplying the input to ROM's 83 and 84 from the output of a battery 85 of exclusive-OR (XOR) gates, the first inputs of which all have the secondmost significant bit of $\phi$ applied to them, and the second inputs of which have the still less significant bits of $\phi$ applied to them. Respective bits of the $A \cos \phi$ output of ROM 83 are applied to the first inputs of a battery 86 of XOR gates which selectively complement the bits of that output in its own output when the common connection of their second inputs is supplied a ONE. Complementing is done when a multiple of the $A \cos \phi$ term as expressed in two's complement form is to be subtracted in one of the accumulators 81 and 82. If the $A \cos \phi$ term or a multiple thereof is to be added in one of the accumulators 81 and 82, the interconnected second inputs of battery 86 of XOR gates are supplied a ZERO and forward $A \cos \phi$ without complementing. The $A \sin \phi$ output of ROM 84 is similarly selectively complemented by a battery 87 of XOR gates with first inputs receiving respective ones of its bits. If $A \sin \phi$ or a multiple thereof is to be subtracted in one of the accumulators 81 and 82, the ONE is applied to the interconnected second inputs of these gates so their outputs provide the complement of $A \sin \phi$. If $A \sin \phi$ or a multiple thereof is to be added, a ZERO is applied to the second inputs of these gates.

The determination of whether $A \cos \phi$ from ROM 83 is to be added or subtracted during each step of accumulation in each of the accumulators, 81 and 82 is made as follows. Firstly, $\cos \phi$ (indeed, the cosine of any angle) is known to be positive in the first and fourth quadrants thereof and negative in the second and third quadrants thereof, so an XOR gate 86 to which the firstmost and secondmost significant bits of $\phi$ are applied as inputs is used to supply the first input of an exclusive OR gate 90 an output ZERO in the first and fourth quadrants of $\phi$, and to supply to the first input of gate 90 an output ONE in the second and third quadrants of $\phi$. Secondly, the direction of accumulation must be taken into account. During the vertical blanking integral $-MA \cos \phi$ and $-NA \cos \phi$ terms have to be initially accumulated in the v and u accumulators 81 and 82, (N equals $2^n$ and is the number of pixels in half a scan line; and M equals $2^m$, is the number of scan lines in half a field, and equals N in the special case being particularly considered here, as will be explained in detail later on.) During horizontal retrace of the display it is desirable to subtract 2NA $\cos \phi$ from the u accumulator 82 during a "b" portion of horizontal blanking period when this subtraction is to be done, a pulse is furnished as a first input to an OR gate 89 receptive of VERTICAL BLANKING pulse as a second input. So at times $-A \cos \phi$ is desired for accumulation, OR gate 89 supplies a ONE as input to an XOR gate 90, which responds with an output that complements the output of XOR gate 88 supplied as its other input. The output of XOR gate 90 is then a ZERO when the A $\cos \phi$ output of ROM 83 or a multiple thereof is to be added during accumulation and is a ONE when such should be subtracted.

A v input multiplexor 91 and a u input multiplexor 92, the outputs of which respectively supply input to v accumulator 81 and input to u accumulator 82, receive at their respective first and second inputs a two's complement number, the most significant bits of which are the output from XOR gate 90 and the less significant bits of which are the output from the battery 86 of XOR gates. Except when the control inputs of input multiplexors 91 and 92 receive a SELECT pulse (generated in a manner described later on in this specification) u input multiplexor 92 selects this number to be forwarded to u accumulator 82 to increment two's complement A x $\cos \phi$, and v multiplexor 91 does not select this number for forwarding to v accumulator 81. When a SELECT pulse is applied to their control inputs, v input multiplexor 91 selects this number to be forwarded to accumulator 81 to increment two's complement A y $\cos \phi$, and u input multiplexor 92 does not select this number to be forwarded to u accumulator 82.

The determination of whether A $\sin \phi$ from ROM 84 is to be added or subtracted during each step of accumulation in each of the accumulators 81 and 82 is made as follows. Firstly, $\sin \phi$ (like the sine of any angle) is known to be positive in the first and second quadrants and to be negative in the second and third quadrants. The most significant bit of $\phi$ supplies appropriate indication of the sign of $\sin \phi$. Secondly, the direction of accumulation must be taken into account. During pixel-by-pixel scanning of a line of picture, (A $\sin \phi$)x terms will be subtracted in the v accumulator 81, and to further this an XOR gate 93 complements the most significant bit of $\phi$ applied to a first of its inputs responsive to a ONE supplied to the other of its inputs from the output of a NOR gate 94 since during picture trace NOR receives no ONE as input. During a portion "a" of vertical blanking pulse, when a negative multiple, $-M$, of A $\sin \phi$ is to be accumulated in u accumulator 82, NOR gate 94 still receives no ONE as input, and its output remains ONE. During a portion "b" of vertical blanking integral, when a positive multiple, N, of A $\sin \phi$ is to be accumulated in v accumulator 81, NOR gate 94 receives a ONE input, which causes its output to be ZERO, so battery 87 of exclusive OR gates pass A $\sin \phi$ without complementing it. During horizontal blanking NOR gate 94 receives a ONE as input which causes its output to be ZERO. So A $\sin \phi$ is then forwarded by battery 87 of exclusive OR gates, without being complemented. In sum, the output of XOR gate 93 is ZERO when $\sin \phi$ is to be added and ONE when it is to be subtracted. This output is used as the most significant bits of a further two's complement number, as well as controlling the selective complementing of the output of ROM 84 by battery 87 of XOR gates, which provides the less significant bits of this further two's complement number describing $\sin \phi$. The u input multiplexor 92 selects this further two's complement number as an input for u accumulator 91 when its control input is supplied a SELECT pulse generated in a manner to be described, and the v input multiplexor selects this futher two's complement number as an input for v accumulator 92 at times other than when SELECT pulse is not applied to its control input.

FIG. 5 shows a modification that can be made to the u, v address generator 32 of FIG. 4. ROM's 93 and 94 which store each of A $\cos \phi$ and A $\sin \phi$ for one octant replace ROM's 83 and 84 which store each of A $\cos \phi$ and A $\sin \phi$ over a full quadrant, effecting a substantial reduction in ROM required. (In practice, since the ROM's 83 and 84 each need only supply one output per field and have the entire vertical retrace interval to furnish updated output, ROM's 83 and 84 may be so cheap, reduction of the ROM requirement may not be worth the cost of the multiplexors involved.) Battery 85 of XOR gates is reconnected so that a battery 95 of all but one of them are supplied the thirdmost significant bit of $\phi$ at their interconnected first inputs and respective ones of the less significant bits of $\phi$ at their second inputs, the output from battery 85 of XOR gates providing input to ROM's 93 and 94.

This input is one bit shorter than that supplied to ROM's 83 and 84 for the same degree of angular resolution in $\phi$, which also tends to reduce required ROM size. The remaining XOR gate 96 is supplied the second-most and thirdmost significant bits of $\phi$ to provide an output used as the control signal for multiplexors 97 and 98, which select the appropriate ones of ROM's 93 and 94 in each octant of $\phi$ to supply A $\cos \phi$ and A $\sin \phi$ as respective outputs for application as first inputs for the batteries 89 and 96 of XOR gates, respectively.

FIG. 6 shows the accumulators 81 and 82 in greater detail. FIG. 6 also shows v input and u input multiplexors 91 and 92, an OR gate 99 for developing the SELECT pulses applied to the control inputs of multiplexors 91 and 92, OR gate 89 for generating control signal for multiplexors 810 and 820 included in accumulators 81 and 82 respectively, and an OR gate 100 for developing REGISTER clock pulses for accumulators 81 and 82.

The core of accumulator 81 is a v adder 811 and a v register 812. Register 812 supplies v coordinate at its output, which coordinate has an integral portion used in the FIG. 1 system as a partial READ address for the one of field storage memories 21 and 22 selected for reading. This coordinate also has a fractional or residual portion forwarded to interpolator 23 to govern interpolation in a first of the two dimensions in which interpolation is done. Upon receiving a REGISTER CLOCK pulse, v register 812 content is updated from the output of v adder 811, which has added the previous content of v register 812 to the output of v-scaling multiplexor 810. The v-scaling multiplexor 810 selects as its output either its input taken directly from the output of v input multiplexor 91 or its input taken from the output of multiplexor 91 via means 813 for multiplying that output by the number, N, of pixels in half a scan line, which here is the same as M, the number of scan lines in half a field. This means 813 in the preferred case where the number of pixels in half a scan line is $2^n$, n being integral, can be simply provided by shifting bit placement in v input multiplexor 91 n places towards more significant places; this is simply a matter of electric connection and does not require any further multiplier hardware. In other cases—e.g. where the number of pixels per line is determined by the desire to sample an NTSC color-television baseband signal four times per color subcarrier cycle—this fixed multiplier multiplication can be simply carried out using ROM.

Accumulator 82 is analogous to accumulator 81 in comprising u-scaling multiplexor 820, u adder 821, u register 822 and means 823 for multiplying by N the output of u input multiplexor 92. Operation of accumulators 81 and 82 is similar, the dissimilarities in their respective output data owing solely to the dissimilarities in the input data supplied them by v input multiplexor 91 and to multiplexor 92. The integral portion of the u coordinate at the output of u register 822 is used in the FIG. 1 system as a partial READ address for the one of field storage memories 21 and 22 selected for reading, and the residue is forwarded to interpolator 23 to govern interpolation in a second of the two dimensions in which interpolation is done.

The initialization of the v and u accumulators 81 and 82 for the x, y coordinates descriptive of the upper left corner of display takes place in vertical blanking interval after a REGISTER RESET PULSE at the beginning of that interval is supplied to register 812 and 822 to reset their contents to "zero". It is desired to then load v register 812 and u registers with the following initial values $u_o$ and $v_o$, respectively, before sweeping out the phantom raster line by line, where N is both the number of pixels per half scan line and the number of scan lines per half field.

$$u_o = (A \cos \phi)(-N) + (A \sin \phi)(-N) \qquad (3)$$

$$v_o = (-A \sin \phi)(-N) + (A \cos \phi)(-N) \qquad (4)$$

To cause multiplication of the A cos $\phi$ and A sin $\phi$ magnitudes by N, the VERTICAL BLANKING PULSE is applied as an input of OR gate 89 causing its output to be a ONE so multiplexors 810 and 820 select from multiplied-up multiplexor 91 and 92 outputs to supply inputs to adders 811 and 821.

In an "a" portion of the vertical blanking interval following REGISTER RESET PULSE, a ONE is applied to an input of OR gate 99, causing its output to go to a ONE that conditions v input multiplexor 91 to select $-A \cos \phi$ as its output and u input multiplexor 92 to select $-A \sin \phi$ as its output. During this time a single clock pulse is supplied to OR gate 100 which sends a REGISTER CLOCK pulse to registers 812 and 822 to accumulate $-NA \cos \phi$ and $-NA \sin \phi$. In another "b" portion of the vertical blanking interval following REGISTER RESET PULSE, no ONEs are supplied the inputs of OR gate 99, so v input multiplexor 91 and u input multiplexor 92 select A sin $\phi$ and $-A \cos \phi$ to be their respective outputs. During this time a single clock pulse is supplied to OR gate 100 which sends a REGISTER CLOCK pulse to registers 812 and 822 causing them to accumulate NA sin $\phi$ and $-NA \cos \phi$, respectively. So, at the beginning of field scan the initial conditions of registers 822 and 812 are respectively described by equations 3 and 4, above.

During the line scan intervals OR gate 99 receives no ONE as input; so its output is ZERO, causing v input multiplexor 91 to select A sin $\phi$ as its output, and causing u input multiplexor 92 to select A cos $\phi$ as its output. OR gate 89 receives no ONE as input; so its output is ZERO, causing v scaling multiplexor 810 to forward $-A \sin \phi$ to v adder 811 directly without its being scaled-up, and causing u scaling multiplexor 820 to forward A cos $\phi$ to u adder 821 directly, without its being scaled up. A GATED PIXEL SCAN RATE CLOCK pulse is supplied to registers 812 and 822 as each pixel in the line is scanned, incrementing the A cos $\phi$ term in u and the $-A \sin \phi$ term in v.

During an "a" portion of the horizontal blanking interval the line scan is incremented. At this time a ONE is applied as input to OR gate 99 causing a ONE at its output that conditions multiplexors 91 and 92 to select A cos $\phi$ and A sin $\phi$ as their respective outputs. No ONE is supplied as input to OR gate 89, and A cos $\phi$ and A sin $\phi$ are selected by multiplexors 810 and 820 for accumulation of v and of u, respectively, responsive to single REGISTER CLOCK pulse supplied via OR gate 100 to registers 812 and 822 in the "a" portion of the horizontal blanking interval.

In a "b" portion of the horizontal blanking interval, the horizontal retrace is to be carried out by twice subtracting (A sin $\phi$)(N) from v register 812 contents and by twice subtracting (A cos $\phi$)(N) from u register 822 contents. At this time no ONE is supplied as input to OR gate 99; so v input multiplexor 91 selects its A sin $\phi$ input for its output, and u input multiplexor 92 selects its A cos $\phi$ input for its output. A ONE input is supplied OR gate 89 which responds with a ONE at its output that conditions scaling multiplexors 810 and 820 to select as their respective outputs the A sin $\phi$ and $-A \cos \phi$ input multiplexor 91 and 92 outputs as multiplied by N. Two clock pulses are applied to registers 812 and 822 via OR gate 100 in the "b" portion of horizontal blanking interval so NA sin $\phi$ is added twice to the previous contents of v register 812 and NA cos $\phi$ is subtracted twice from the previous contents of u register 822.

The accumulation processes described above permit the generation, at video rates, of phantom raster coordinates to a resolution several bits finer than the number of bits that single out a particular row and column addres of the one of the field storage memories 21 and 22 to be read with skewed addresses. These additional bits of address resolution are needed for interpolation among the intensity data stored in address locations closest to the generated u,v address coordinates.

As shown in FIG. 7, systems of scan where M and N differ can be implemented by replacing multiplexors 810 and 820 with multiplexors 810' and 820' that select among input multiplexor 91 and 92 outputs, those outputs multiplied by M, and those outputs multiplied by N, respectively. The outputs of multiplexors 91 and 92 as multiplied by M in multipliers 814 and 824 are selected for accumulation by u accumulator 81 and v accumulator 82 during the "a" portion of the vertical blanking interval; and the outputs of those multiplexors as multiplied by N in multipliers 813 and 823 are selected for accumulation during the "b" portions of the vertical and horizontal blanking intervals: During the times the display is being written, the outputs of multiplexors 91 and 92 are selected for being directly applied to accumulators 81 and 82. E.g., multiplexors 810' and 820' may each comprise three batteries of tri-states with parallel outputs, the first battery forwarding input multiplexor output from low source impedances responsive to a NAND gate indicating absence of vertical blanking signal and "b" portion of horizontal blanking signal, the second battery forwarding input multiplexor output as multiplied by M from low source impedances responsive to the "a" portion of vertical blanking signal, and the third battery forwarding input multiplexor output as multiplied by N from low source impedances responsive to the "b" portions of the horizontal and vertical blanking signals.

FIG. 8 illustrates in greater detail how the two-dimensional interpolator 23 may be constructed. As a convention to facilitate description of the interpolation process, the field storage memory 21 or 22 will be considered to have its storage locations arranged in horizontal rows, addressed in x coordinates during writing and in a u coordinates during reading, and vertical columns, addressed in y coordinates during writing and in v coordinates during reading. This convention will be followed in the claims following this specification as well; but it is not to be construed as limiting upon other spatial orientations of the field storage memories or the display screen, since obviously other orientations are equally feasible. The mathematical expression "a int b" will specify the number of times a may be divided by b without generating a fractional remainder; and "a frac b" will be used as a shorthand expression for a−b(a int b), where a and b are randomly chosen numbers.

At any given pixel scan interval the u,v address generator 32 generates an address having a u coordinate of the form u=(u int 1)+(u frac 1) and having a v coordinate of the form v=(v int 1)+(v frac 1). It is usual to have (u frac 1)≠0 and (v frac 1)≠0, so these coordinates fall among four addressable storage locations in the field storage memory as follows:

(u int 1), (v int 1);

(u int 1+1), (v int 1);

(u int 1), (v int 1)+1; and (u int 1)+1, (v int 1)+1.

These locations are to the upper left, upper right, lower left and lower right, respectively, of the actual point in space defined by the u,v coordinates.

FIG. 9 is a representation of the video amplitudes (shown in analog form by four solid arrows coming out of the page) at four such points in memory, which are to be interpolated among in two dimensions to obtain the video amplitudes at spatial coordinates (u int 1)+(u frac 1), (v int 1)+(v frac 1). The interpolation procedure is to interpolate in u dimension between the video amplitudes at u int 1, v int 1 and at (u int 1)+1, v int 1 to obtain a first intermediate interpolation result; interpolate in that same dimension between the video amplitudes at u int 1, (v int 1)+1 and at (u int 1)+1, (v int 1)+1 to obtain a second intermediate interpolation result; and finally to interpolate in the orthogonally disposed v dimension between the intermediate interpolation results to obtain a final interpolation result.

The first intermediate interpolation result is obtained in the FIG. 8 aparatus by subtracting video amplitude at u int 1, (v int 1)+1 from that at (u int 1)+1, (v int 1)+1 in a subtractor 101 to obtain the slope of the line connecting the video amplitudes at these two points (inasmuch as these points are unity distance apart). These video amplitudes are in digital form as they come from the field storage memory, so the resulting slope is in digital form. The slope then multiplies the u frac 1 in a digital multiplier 102 to obtain the value to be added in an adder 103 to the video amplitude at u int 1, (v int 1)+1 to obtain the first intermediate interpolation result. The second intermediate interpolation result is analogously calculated, differentially combining the video amplitudes at u int 1, v int 1 and (u int 1)+1, v int 1 in subtractor 104; multiplying the resulting difference by u frac 1 in a digital multiplier 105; and adding the product in an adder 106 to the video amplitude at u int 1, v int 1. Interpolation in the vertical plane is then carried out between the intermediate results obtained from the preceding interpolations in the horizontal plane. The second intermediate interpolator result is subtracted from the first in subtractor 107; the difference is multiplied by v frac 1 in a digital multiplier 108; and the product is added in an adder 109 to the second intermediate interpolation result to obtain the final interpolation result.

The two-dimensional linear interpolation can alternatively be carried out by making two interpolations in the vertical plane, followed by an interpolation in the horizontal plane. Surprisingly, the simple linear interpolation schemes disclosed above work well in practice, providing a substantial portion of the image improvement obtainable by more complex interpolation processes. Further, algebraic interpolation according to linear or cubic polynomials or certain other functions can be done by calculation to avoid the need for ROM to look up interpolation coefficients. The read-out from four storage locations required for the linear interpolation process can be obtained by reading out the field storage memory four times as each pixel is scanned, altering one of the address coordinates by one on each successive readout.

FIG. 10 shows how a field storage memory may be organized to provide the four read-outs in parallel, so read out can take up a longer portion of the pixel scan time. The field storage memory is divided into four portions 111, 112, 113 and 114 read out in parallel via a multiplexer 110 to simultaneously supply four bytes of video amplitude information in parallel to the two-dimensional linear interpolation circuitry 23. The least significant bits of v int 1 and u int 1 control the output multiplexor 110 which accesses the memories depending on whether odd or even column address is at the left in the square arrangement of four adjacent locations in memory under consideration and on whether an odd or even row address is uppermost in the arrangement. For certain square arrangements shown as those where the least significant bits of v int 1 and u int 1 both are "zero", the submemories are addressed similarly in v and u.

For squares of four adjacent memory locations displaced one row downward, the lowermost row should be at a row address one higher than the uppermost row. This is taken care of by row-addressing submemories 113 and 114 with the output of adder 115, which adds the least significant bit of v int 1 to the more significant bits of v int 1, used directly to row-address submemories 111 and 112.

For squares of four adjacent memory locations displaced one column to the right, the rightmost column should be at a column address one higher than the leftmost column. This is taken care of by column-addressing submemories 112 and 114 with the output of adder 116, which adds the least significant bit of u int 1 to the most significant bits of u int 1, used directly to column-address submemories 111 and 113.

When the portions 111, 112, 113, and 114 of the field storage memory are addressed responsive to x and y coordinates rather than u and v coordinates, which occurs during writing digitized video into the memory, an input multiplexor 117 responds to the least significant bits of the x and y coordinates to commutate the digitized video into the appropriate one of these portions of the field storage memory.

Rather than loading the field storage memory serially one sample at a time and reading from it four samples at a time, with suitable input and output buffer memories the field storage memory can be loaded more than one sample at a time and read more than four samples at a time, to allow the field storage memory to be clocked at a submultiple of video scan rate.

The perimeter of a tilted phantom raster will not register with the "perimeter" of a rectangular array of storage locations in a field storage memory, nor with the perimeter of a rectangular display screen. In display systems for digitally generated graphics this usually presents no problem since the display screen is conditioned to be black or to display a background color, except when contrary information is read out of FSM. In display systems for camera-originated images this lack of registration is a problem, unless the image to be rotated is extracted from a complete scene by chrominance-or luminance-keying techniques. This problem can be dealt with in industrial or surveillance television systems by restricting the display to a circular area fully scanning a round cathode ray tube, addressing each field storage memory with an overscanned raster of addresses during reading and writing, and restricting the active storage locations in each memory to those conformally mapping display positions within the circular perimeter defining display bounds. A camera used with such a system would overscan the circular display field, too.

In the rotation of broadcast television images, however, the same frame scan and synchronizing signals must be used on the video with rotated image as on incoming video with non-rotated image. So rotation will normally be accompanied by image compression, or zoom-out, with background matter being introduced into those portions of the raster not occupied by the compressed image. Image compression is normally done by raster-scanning field storage memory at lower horizontal and vertical scan rates during writing than during reading.

FIG. 11 shows representative circuitry for electrically ganging the rotation of the display image and its compression by an image compressor 120 introduced between the analog-to-digital converter 14 and two-dimensional spatial filter 15 in the simplified monochromatic apparatus of FIG. 1.

The programmed DISPLAY ROTATION ANGLE $\phi$ is applied to one input of a digital comparator 121, the other input of which is supplied by the COUNT OUTPUT signal from an up-down counter 122 selectively clocked with clock pulses supplied during vertical blanking interval, as controlled by a clock gate 123. Clock gate 123 supplies clock signal to counter 122 only so long as COUNT OUTPUT of counter 122 differs from DISPLAY ROTATION ANGLE $\phi$, so COUNT OUTPUT slews at predictable rate to match DISPLAY ROTATION ANGLE $\phi$. The clockwise or counterclockwise direction of this slew is controlled by UP-DOWN COMMAND to counter 122. The OUTPUT of the up-down counter 122 is applied to u, v address generator 32 to control the angle of rotation, rather than DISPLAY ROTATION ANGLE $\phi$ being directly applied, so the image compression does not interfere with interpolation during each field scan of the outputs, from the one of FSM's 21 and 22 selected for reading.

The output of XOR gate 88 is applied to the first inputs of a battery 126 of XOR gates which receive the thirdmost significant bit and less significant bits of $\phi$ at their respective second inputs. These bits appear without complementing at the outputs of battery 126 of XOR gates when $\phi$ lies in the first or third quadrant and with complementing when $\phi$ lies in the second or fourth quadrant; and they are applied as input to a ROM 127 which stores the proper compression coefficient for that angle. UPDATE COMPRESSION COEFFICIENT output from ROM 127 is supplied to image compressor 120, but only if the degree of image compression is increased as COUNT OUTPUT of counter 122 changes, so that the compression of the image will not vary in and out as $\phi$ is stepped. This conditional forwarding of UPDATE COMPRESSION COEFFICIENT to image compressor 120 is carried out using a compression-coefficient register 128 as a buffer between ROM 127 and frame image compressor 120 and clocking the UPDATE COMPRESSION COEFFICIENT into register 128 responsive to REGISTER CLOCK PULSE supplied by digital comparator 129 when register 128 output contains a REGISTER COMPRESSION COEFFICIENT indicating less compression than the UPDATE COMPRESSION COEFFICIENT. When $\phi$ is to be changed, after cut back to normal raster scan during a scene change, during the cut back to normal raster scan register 128 is reset to a REGISTER COMPRESSION COEFFICIENT indicating minimal compression. More sophisticated image-compression control circuitry, allowing change in $\phi$ without cutback to normal raster scan, but still without undersirable in and out variation of compression, can be readily designed by those skilled in the art.

The compression of the phantom raster, as it is rotated from normal raster position, is accompanied by an overscanning of the FSM 21 or 22 being read. When the FSM being read is supplied addresses which are selected bits of an overscan address, the memory is erroneously addressed. It is desirable then to key out the interpolated memory output and to key in the background mat against which the shrunken phantom raster is rotated. Overscan in the v direction is detected by elements 131–134 acting in combination, and overscan in the u direction is detected by elements 135–138 acting in combination. The indications of u and v overscan are OR'd in an OR gate 139 to provide an indication of overscan condition that is supplied as control signal to a multiplexor 140 that keys the background mat video information into the output video in place of linear interpolator 23 output. The output of OR gate 139 may also be used to control the inhibition of READ ENABLE signal to the one of FSM's 21 and 22 selected for reading.

Battery 131 of XOR gates responds to the most significant bit of v int 1 coordinate being ONE to complement negative values of this two's complement number, to which this most-significant bit is added in adder 133 after shift 132 to least significant bit position. If the most significant bit of v int 1 is ZERO it is forwarded through battery 131 of XOR gates and adder 133 without change. So the output of adder 133 is the absolute value of v int 1. Digital comparator 134 compares v int 1 to the number of lines per half field and only if it be equal or larger supplies a ONE to an input of OR gate 139. Battery 135 of XOR gates, shift connection 136, adder 137, and digital comparator 138 respond to u int 1 to supply a ONE to OR gate 139 only if the u int 1 output of adder 137 be equal or larger than half the number of pixels per scan line.

Arranging comparators 134 and 138 to supply an output ONE for equal inputs condition suppresses the edge tear that occurs in interpolator 23 output for lack of four input samples at edges of the stored field information, insofar as input to digital-to-analog converter 24 is concerned. Alternatively, comparators 134 and 138 can be arranged to supply output ONEs only if v int 1 be larger than the number of lines per half field and if u int 1 be larger than the number of pixels per half line, respectively. Edge tear caused by rastering effects on the sides of the rotated picture can then be taken care of by providing a sample of background mat for each missing sample in the two-dimension interpolation process.

Where the number $2^m$ of scan lines per half field is an integral power of two,—i.e. where m is integral—elements 131, 132, 133, and 134 can be replaced with an exclusive OR gate to which the $m^{th}$ and $(m+1)^{st}$ bits of v int 1 are applied as inputs, the output of that exclusive OR gate being applied to OR gate 139. Where the number $2^n$ of pixels per-half scan line is an integral power of two—i.e. where n is integral—elements 135, 136, 137, and 138 can be replaced by an exclusive OR gate to which the $n^{th}$ and $(N+1)^{st}$ bits of u and 1 are applied as inputs, the output of that exclusive OR gate being applied as the second input to OR gate 139.

In broadcast television studio apparatus the television signals being handled normally describe polychromatic display information, and FIG. 12 shows more complex phantom raster generation apparatus which wil rotate color television signals. The picture-interval portions of an NTSC TW SIGNAL IN are selected by a video gate 150 for application to an analog-to-digital converter 151, where they are sampled at a multiple of chroma subcarrier frequency and the samples are digitized. The stream of digitized samples are fed to a complex digital filter 152, known in the art, to recover baseband luminance component and baseband first and second chrominance components. This is the proper format for application to an image compressor 153. Full digital processing for PAL or SECAM television signals to resolve them into baseband components is difficult, however. But the apparatus just described can be replaced by processing circuitry for recovering baseband luminance and chrominance signals, just as in a broadcast-studio television monitor, and separate analog-to-digital converters for digitizing these signals.

The digitized second chrominance signal is supplied as a data rate lower than that of the digitized luminance signal and possibly that of the digitized first chrominance signal. It is passed through a two-dimensional spatial-frequency low-pass filter 154 to make its resolution more uniform in each radial direction in the display image, prior to its being stored on alternate fields in field storage memories 213 and 223, respectively. The digitized first chrominance signal is passed through a two-dimensional spatial-frequency low-pass filter 155 to make its resolution in each radial direction in the display image more uniform prior to its being stored in alternate fields in field storage memories 212 and 222, respectively. Filter 155 has a delay equalization shift register 156 cascaded with it if the data rate of the samples it is supplied exceeds that of the samples filter 154 is supplied. The digitized luminance signal is passed through the cascade connection of a two-dimensional spatial-frequency low-pass filter 157 and a delay equalization shift register 158 to make more uniform its resolution in each radial direction in the display image, prior to its being stored on alternate fields in field storage memories 211 and 221, respectively.

The alternate-field outputs of skew-addressed memories 211 and 212 are supplied to linear interpolator 231, and the resulting interpolator outputs are applied as input to digital-to-analog converter 241, which supplies analog luminance response to a television signal generator 250. The alternate-field outputs of skew-addressed memories 212 and 222 are supplied to linear interpolator 232, and the resulting interpolator outputs are applied to digital-to-analog converter 242 which supplies analog first chrominance response to television signal generator 250. The alternate field outputs of skew-addressed memories 213 and 223 are supplied to linear interpolator 233, and the resulting interpolator outputs are converted to analog form for application to generator 230 by digital-to-analog converter 243. Television signal generator 250 generates a new color-multiplexed video signal from the luminance and first and second chrominance signals supplied from the converters 241, 242 and 243, and from keyed background. Its synchronizing signals are regenerated in response to timing information from timing control circuitry 251. Timing control circuitry 251 typically includes sync and color-burst separators supplied NTSC TV SIGNAL IN and uses the separated sync and color-burst to provide AFPC (automatic phase and frequency control) of a master clock generator operating at a multiple of chroma subcarrier frequency. Frequency dividers are used to generate a number of timing signals synchronized by comparison with incoming sync and color-burst, which are needed by the phantom raster generating apparatus as well as by the television signal generator 250. Timing control circuitry 251 supplies the multiple (usually the fourth multiple) of chroma subcarrier used by analog-to-digital converter 151 to time its sampling of video. Circuitry 251 provides chroma subcarrier and its harmonics, if required, as clocking signal to digital filter 152. Circuitry 251 generates clock and reset signals for the Cartesian coordinate address generators in image compressor 153 and generates control signal for the time-division multiplexor used with them. It also generates clock and reset signals for x,y address generator 31 and u,v address generator 32 and generates control signal for address multiplexor 30. Timing control circuitry 251 is also depicted as including the odd- or even-field determination circuitry, which can take a vairety of forms. Where the spatial-frequency filters 154, 155 and 157 are of types requiring clocking signals, these too will be furnished from timing control circuitry 251. The construction of appropriate timing control circuitry 251 is a mere matter of design for one skilled in the art and will not be described in detail.

When the phantom raster generating apparatus is to be used to rotate television signals using United States of America broadcast standards, for example, it is convenient to use 4 MHz, 1 MHz and 0.5 MHz bandwidths for the Y luminance signal, an I chrominance signal, and a Q chrominance signal. This reduces the number of samples per scan line that have to be shared by the FSM's 212, 222, 213 and 223, as these memories can be made with smaller arrays of storage locations. FSM's 211 and 212 are alternately supplied x int 1 and y int 1 WRITE addresses and u int 1 and v int 1 READ addresses; and interpolator 231 is supplied u frac 1 and v frac 1 to govern the interpolator among FSM 211 or 221 outputs. FSM's 212 and 222 are alternately supplied x int 4 and y int 4 WRITE address and u int 4 and v int 4 READ addresses; and interpolator 242 is supplied u frac 4 and v frac 4 to govern the interpolation among FSM 212 or 222 outputs. FSM's 213 and 223 are alternately supplied x int 8 and y int 8 WRITE addresses and u int 8 and v int 8 READ addresses; and interpolator 243 is supplied u frac 8 and v frac 8 to govern the interpolation among FSM 213 or 223 outputs.

Alternatively, other orthogonal first and second chrominance signals may be used. They may comprise R-Y and B-Y color difference signals, both sampled at 0.5 MHz rate. In such instance the low-pass filters 154 and 155 will be identical and delay-equalization shift register 156 will be replaced by a direct coupling. Or the same low-pass filter can be used on a time-division multiplex basis for both R-Y and B-Y chrominance signals.

The lower data rate of the chrominance signals as compared to the luminance signal, and the consequent slower address rate of the field storage memories used to store chrominance values make it possible to time-division multiplex the outputs from these memories, so that one two-dimensional linear interpolator can be used for interpolating between all output data from FSM's 212, 222, 213, and 223.

Two-dimensional spatial-frequency low-pass filters that sample as large as a 15×15 square array of pixels may be desirable in broadcast studio equipment, which means that an appreciable amount of memory is involved in the digital filtering. It then becomes attractive to take the 225 pixels of information in parallel from the field storage memory used in the image compressor. This parallel accessing is done by extending the technique shown in FIG. 10 for subdividing the memory into four parts.

As shown in FIG. 13 a field storage memory 300 divided into 256 portions accessed during writing through an input multiplexor 301 and during reading through output multiplexor 302 is included in the image compressor. Separate FSM's for Y, I, and Q are normally used in an image compressor, so that interpolation "during" writing can be carried out though only one of these FSM's, 300, is shown. Not all the 256 data outputs available from memory 300 are used in the digital filtering, which requires rectangular arrays with odd numbers of sample points on each side, so output multiplexor 302 can be simplified to provide only 225 outputs taken from a corner of the 256-point array accessed by its inputs. These outputs are supplied as inputs to a weighted-summation network 303, which is an extended version of the weighted-summation network in the lower half of FIG. 2, and which responds to supply filtered video output.

Each of the 256 portions of memory 300 can be identified by the x mod 16 and y mod 16 values of the columns and rows in a conventional FSM that are stored in that portion of the FSM. The (x mod 16=0, y mod 16=all values from 1 to 16) portions of the FSM 300 receive as column addressing the image compressor column address in truncated form with its four least significant bits suppressed, and the other portions of the FSM 300 receive as column addressing a modified column address equal to either that truncated column address or that truncated column address augmented by unity. This column addressing is supplied from x' WRITE address or x READ address modification circuitry 304. The (y mod 16=0, y mod 16=all values from 1 to 16) portions of the FSM 300 receive as row addressing the image compressor row address in truncated form with its four least significant bits suppressed, and the other portions of the FSM 300 receive as row addressing a modified row address equal to either that truncated row address or that truncated row address augmented by unity. This row addressing is supplied from y' WRITE address or y READ address modification circuitry 305.

FIG. 14 shows appropriate decision circuitry for generating each modified column (or row) address coordinate, the operation of which will be described in READ address terms. The four least significant bits of the x (or y) address coordinate are compared in a comparator 306 to the x mod 16 (or y mod 16) identification of the memory 300 portion for which modified address is being generated, to generate a ONE when they equal or exceed that identification, or a ZERO when they do not. Comparator 306 output is added in an adder 307 to the truncated column (or row) address coordinate to yield the modified address coordinate.

The image rotators used in connection with broadcast television signals differ from the earlier described ones for use in industrial or surveillance television systems in that the pixel dimensions normally are not square. Spatially adjacent picture samples are separated vertically by alternate scan lines, owing to the interfaced fields, which sets the vertical dimension of each pixel. Horizontally, the separation of samples is set by sampling rate, which is usually chosen to be a multiple of chroma subcarrier frequency to facilitate separation of luminance and chrominance by digital filtering. In the two-dimensional spatial-frequency low-pass filters (such as 154, 155, 157 of FIG. 12) the matrix of weighting coefficients is chosen to have elliptical, rather than circular, cross-sections parallel to the two-dimensional plane, the weighting coefficients being calculated by rotating in appropriate degree the two-dimensional response about its horizontal or vertical axis. The degree of rotation chosen is so as to obtain pass-bands providing substantially the same resolution of detail in all directions in the display fields.

To accommodate non-square pixels, modifications must also be made to the accumulation processes used to generate rotated Cartesian coordinates u and v. The transformation equations (1) and (2) between x, y and u, v coordinate systems set forth earlier in this specification are modified to the transformation equations (3) and (4), following, where k is the number of units in x or u to define a given spatial distance divided by the number of units in y or v to define the same spatial distance.

$$u = A\,x\cos\phi + A\,k\,y\sin\phi \quad (3)$$

$$v = -(A/k)x\sin\phi + A\,y\cos\phi \quad (4)$$

The Ak sin $\phi$ and $-(A/k)$ sin $\phi$ terms may be looked up from a pair of separate ROM's to supply inputs for u and v input multiplexors 91 and 92, respectively; or a single $(A/k)$ sin $\phi$ ROM in conjunction with a digital multiplier wired to multiply the ROM output by $k^2$ may be used instead. One may also use $(1/k)$ cos $\phi$ and $(1/k)$ sin $\phi$ ROM's to store functions only an octant of $\phi$, rather than a quadrant, together with $\phi$ address multiplexing. In such case look-up of the $(1/k)$ cos $\phi$ term will be followed by digital multiplication by Ak, and look-up of the $(1/k)$ sin $\phi$ term will be followed by its digital multiplication by A and by $Ak^2$. These digital multiplications can be done relatively slowly during vertical retrace interval and the results held in latch circuitry during the ensuing field scan.

The accumulation processes can be further modified to include further scaling down or up of the u, v coordinates for facilitating image expansion or compression using the same set of field storage memories used in the image rotation process. This, of course, eliminates the need for alternately written and read FSM's in an image compressor, which is a substantial saving in hardware. But, it is also attractive to do this because it reduces the amount of image resampling that must be done, so there is less degradation of the image of the final video signal. The bandwidth of the two-dimensional spatial-frequency low-pass filter has to be scaled proportionally up or down to accommodate the expansion or contraction, although for substantial image expansion the inherent spatial bandwidth limitations on the samples in the original video signal may be such that a low-pass spatial-frequency filter prior to FSM is unnecessary.

The construction of such adaptable-bandwidth filters for broadcast television is sufficiently complex that a block diagram of it would extend over several plates of drawing. The basic idea of how such a filter can be constructed can be conveyed with reference to a simpler system of the type shown in FIG. 1. Consider the lower portion of the FIG. 2 spatial-frequency low-pass filter to be modified as shown in FIG. 15. The M connection from shift register 43 and the outputs of adders 51, 52, 53, 54 and 55 connect to first inputs of digital multipliers 160, 161, 162, 163, 164 and 165, respectively, the outputs of which are summed in adder network 66. ROM's 60, 61, 62, 63, 64 and 65 are not used. The weighting coefficients digital multipliers 160, 161, 162, 163, 164 and 165 are to multiply their respective first inputs by weighting coefficients supplied to their second inputs from the outputs of ROM's 60', 61', 62', 63', 64' and 65' responsive to a bandwidth control signal dependent on the scaling factor A being applied to their inputs. The adaptable-bandwidth filters for broadcast television are more complex in that larger rectangular arrays of video signal samples are involved and in that the elliptical pass-bands of these filters exhibit only quadrantal and not octantal symmetry. In the larger rectangular arrays, reasonably well-shaped cylindrical bandpass characteristics can be maintained over a considerable range of bandwidth adjustment.

Other ways to realize the adjustable bandwidth two-dimensional spatial-frequency filters exist. The multipliers 160–165 of FIG. 13 can be replaced by random access memories into which arrays of weighting coefficients are loaded using table look-up from ROM of suitable Bessel coefficients. Or one can weight the M output of register 43 and the outputs of preliminary adders 51–55 using them as only portions of the inputs to ROM's receiving farther input bits descriptive of compression coefficient information, the outputs of which ROM's are then summed in final adder network 66.

Arrangements in which the aspect ratio of the image are altered can be provided as well, by using separate individual A scaling factors, which may differ from each other, in the accumulation processes used to generate u and v coordinates for reading from FSM. The construction of the adaptable bandwidth filter is altered to suit. ROM's 60', 61', 62', 63', 64' and 65' can be expanded to include weighting coefficients for defining cylindrical pass-bands having elliptical cross-sections with differing proportions of transverse and conjugate axial dimensions. Rather than being input-addressed with a bandwidth control signal with just bits dependent upon a common scaling factor A, these expanded ROM's are input-addressed with a control signal having more bits, as determined by both of the individual scaling factors.

What is claimed is:

1. Phantom raster generating apparatus comprising:
a field storage memory with storage locations addressed by column and by row conformally mapping the pixels in at least a portion of a display field, for storing data descriptive of an image in said display field;
means for generating a phantom raster scan in first and second orthogonal coordinates by a transformation from an x and y Cartesian coordinate description of raster scan proceeding pixel by pixel at relatively fast scan rate in the x direction and line by line at relatively slow scan rate in the y direction, which transformation includes at least at times a rotation between coordinate systems, each of said first and said second coordinates having a respective fractional portion or residue as well as a respective integral portion or modulus, which residue may at times be zero-valued;
means for addressing the columns of said field storage memory during its writing with x coordinates of raster scan and the rows of said field storage memory during its writing with y coordinates of raster scan;
means for applying digital video to said field storage memory as input during its writing, including
a two-dimensional spatial-frequency filter for suppressing high-spatial-frequency content of the digital video applied to said field storage memory;
means for reading said memory, including
means for applying to said field storage memory, during each cycle of video scan, a pair of adjacent column addresses derived from the modulus of said first coordinate and a pair of adjacent row addresses derived from the modulus of said second coordinate, to develop successive samples of first, second, third, and fourth data streams; and
means for performing a two-dimensional interpolation among said first, second, third and fourth data streams for obtaining successive samples of an output video signal.

2. Phantom raster generating apparatus as set forth in claim 1 wherein said means for generating said phantom raster scan includes:
means responsive to a control signal for controlling the degree of the rotation of the system of coordinates comprised by said first and second orthogonal coordinates respective to said x and y Cartesian coordinate system.

3. Phantom raster generating apparatus as set forth in claim 1 wherein said first and second coordinates are also Cartesian coordinates.

4. Phantom raster generating apparatus as set forth in claim 3 wherein said two-dimensional spatial-frequency filter has a pass-band providing substantially the same resolution in all directions in said display field.

5. Phantom raster generating apparatus as set forth in claim 1, 3 or 4 wherein said means for performing a two-dimensional interpolation includes:
means for subtracting from successive data in said first data stream correspondingly timed data in said second data stream to obtain a fifth data stream;
means for multiplying successive data in said fifth data stream by the correspondingly timed residues of said first phantom-raster coordinate to obtain a sixth data stream;
means for adding successive data in said sixth data stream of correspondingly timed data in said second data stream to obtain a seventh data stream of first intermediate interpolation results;
means for subtracting from successive data in said third data stream correspondingly timed data in said fourth data stream to obtain an eighth data stream;
means for multiplying successive data in said eighth data stream by the correspondingly timed residues of said first phantom-raster coordinate to obtain a ninth data stream;
means for adding successive data in said ninth data stream to correspondingly timed data in said fourth data stream to obtain a tenth data stream of second intermediate interpolation results;
means for subtracting from successive data in said seventh data stream correspondingly timed data in said tenth data stream to obtain an eleventh data stream;
means for multiplying successive data in said eleventh data stream by correspondingly timed residues of said second phantom-raster coordinate to obtain a twelfth data stream; and
means for adding successive data in said twelfth data stream to correspondingly timed data in said tenth data stream to obtain a thirteenth data stream of final interpolation results, corresponding to said successive samples of an output video signal.

6. Phantom raster generating apparatus for digital television signal having successive fields, said apparatus comprising:
a two-dimensional spatial-frequency filter for removing excessively high spatial frequencies from video portions of said digital television signal to provide a filtered digital video signal;
means for identifying alternate fields of said digital television signal as even and the intervening fields as odd;
first and second field storage memories, the first arranged to be written by said filtered digital video signal on odd fields and to be read on even fields, and the second arranged to be read on odd fields and to be written by said filtered digital video signal on even fields, each of said memories being singly addressed by individual column address and by individual row address during writing and being quadruply addressed by two successive column addresses and two successive row addresses during reading to supply four data samples per write cycle;
means for generating a raster scan in x and y orthogonal Cartesian coordinates a column and row addresses respectively of the one of said first and second field storage memories being written;
means for generating a raster scan in u and v orthogonal Cartesian coordinates having the same origin as said x and y coordinates and having a prescribed degree $\phi$ of rotation from said x and y coordinates, said u and v coordinates each having a fractional or residual portion in addition to having an integral or modular portion, either or both of which residual portions at times may be zero-valued;
means for applying numbers equal to the modular portion of said u coordinate as summed with two consecutive numbers, respectively, as column addresses to the one of said first and second field storage memories being read;
means for applying numbers equal to the modular portion of said v coordinate as summed with two consecutive numbers, respectively, as row addresses to the one of said first and second memories being read; and
means governed by residual portions of said u and v coordinates for performing a two-dimensional linear interpolation between said four data samples supplied from the one of said first and second field storage memories being read to provide rotated filtered digital video signal.

7. Phantom raster generating apparatus as set forth in claim 6 wherein said means for applying numbers equal to the modular v coordinate as summed with two consecutive numbers, respectively, as row addresses to the one of said first and second memories being read includes:
means for applying the modular v coordinates as one set of row addresses to the one of said first and second memories being read; and
means for incrementing the modular v coordinates by unity to supply another set of row addresses to the one of said first and second memories being read.

8. Phantom raster generating apparatus as set forth in claim 6 or 7 wherein said means for applying numbers equal to the modular u coordinate as summed with two consecutive numbers, respectively, as column addresses to the one of said first and second memories being read includes:
means for applying the modular u coordinates as one set of column addresses to the one of said first and second memories being read; and
means for incrementing the modular u coordinates by unity to supply another set of column addresses to the one of said first and second memories being read.

9. Phantom raster generating apparatus for color television signal comprising:
means for supplying said color television signal as digital base-band luminance component and digital base-band first and second orthogonal color-coordinate chrominance components, each of which components has substantially uniform spatial-frequency resolution in all directions;
means for identifying alternate fields of said television signal as even and the intervening fields as odd;
first, second, third, fourth, fifth, and sixth field storage memories, each having respective storage locations selectively addressed by column and by row, having respective input and output, being enabled to store information applied to its input in addressed storage locations responsive to WRITE ENABLE signal, and being enabled to read out stored information from addressed storage locations through its output responsive to a READ ENABLE signal, the inputs of said first and second field storage memories connected to receive said uniform-spatial-frequency-resolution digital luminance component, the inputs of said third and fourth field storage memories connected to receive said uniform-spatial-frequency-resolution digital first chrominance component, the inputs of said fifth and sixth field storage memories connected to receive said uniform-spatial-frequency-resolution digital second chrominance component;

means for applying, during and only during said even fields, WRITE ENABLE signals to said first, third, and fifth field storage memories and READ ENABLE signals to said second, fourth, and sixth field storage memories;

means for applying, during and only during said odd fields, WRITE ENABLE signals to said second, fourth and sixth field storage memories and READ ENABLE signals to said first, third, and fifth field storage memories;

means for generating a raster scan in orthogonal x and y Cartesian coordinates with pixel by pixel scan at video scan rate in the x direction and line by line scan at a submultiple of video scan rate in the y direction;

means for generating a raster scan in orthogonal u and v Cartesian coordinates having the same origin as said x and y coordinates, having a prescribed degree of rotation from said x and y coordinates, and having a prescribed degree of scaling respective to said x and y coordinates, said u and v coordinates each having a fractional or residual portion in addition to having an integral or modular portion, either or both of which residual portions at times may be zero-valued;

means for applying said x and y coordinates as column and row addresses to said first, third, and fifth memories during said even fields and to said second, fourth and sixth memories during said odd fields;

means responsive to modular portions of said u and v coordinates for generating during each pixel scan interval a plurality of column and row address locations surrounding the point in the television display specified by said u and v coordinates:

means for applying those addresses to said second, fourth, and sixth memories during said odd field, and to said first, third, and fifth memories during said even fields; and means responsive to residual portions of said u and v coordinates for two-dimensionally interpolating among the outputs of the one said first and second memories then provided WRITE ENABLE signal to provide a rotated digital luminance component;

means responsive to residual portions of said u and v coordinates for two-dimensionally interpolating among the outputs of the one of said third and fourth memories then provided WRITE ENABLE signal to provide a rotated digital first chrominance component; and means responsive to residual portions of said u and v coordinates for two-dimensionally interpolating among the outputs of the one of said fifth and sixth memories then provided WRITE ENABLE signal to provide a rotated digital second chrominance component.

10. Phantom raster generating apparatus as set forth in claim 9 wherein said means for supplying said color television signal as a digital luminance component and as digital first and second chrominance components, each of which components has substantially uniform spatial-frequency resolution in all directions, comprises:

means for converting said color television in non-digital form to its baseband luminance component and its baseband first and second orthogonal color-coordinate chrominance components, all in digital form;

first, second, and third means for two-dimensional spatial-frequency low-pass filtering of said digital baseband luminance component, said digital baseband first chrominance component, and said digitized baseband second chrominance component, respectively, to provide said uniform-spatial-frequency-resolution digital luminance component, said uniform-spatial-frequency-resolution digital first chrominance component, and said uniform-spatial-frequency-resolution digital second chrominance component.

11. Phantom raster generating apparatus as set forth in claim 9, including:

first, second, and third digital-to-analog converter means responding to said rotated digital luminance, first chrominance and second chrominance components, respectively, to respectively provide rotated analog luminance, first chrominance and second chrominance signals; and television signal generating means responsive to said rotated analog luminance, first chrominance and second chrominance components to generate a composite color television signal, said television signal generating means including means responding to the synchronizing signal portions of said color television signal for generating synchronizing signal delayed one scan line in time.

12. In combination:

means for supplying a color television signal as digital baseband components, one of which is a luminance component sampled at video rate and another of which comprises samples of at least one chrominance component sampled at a lower rate; and a plurality of two-dimensional spatial-frequency filters having respective inputs each receptive of a respective one of said digital baseband components and having respective outputs for supplying digital baseband responses having substantially uniform spatial resolution in all directions insofar as the display field is concerned.

13. A two-dimensional spatial-frequency low-pass filter comprising:

means for generating sampled data in digital form descriptive of the intensities of a quantity at points along a raster-scanned spatial field—i.e. a field scanned line by line at a relatively slow rate with each line scanned point by point at a relatively fast rate m times said relatively slow rate, where m is a positive integer;

means for providing clock signals at said relatively fast rate;

an odd numbered plurality—$2n+1$, where n is a positive integer—of shift registers, each having $2p+1$ stages—where p is a positive integer—between its input and output which stages shift data responsive to each said clock signal;

a number 2n of clocked delay lines, each providing a delay between its input and output equivalent to a time duration including m−(2p+1) clock signals;

a cascade connection of said shift registers with one of said clocked delay lines interposed between each successive shift register in the cascade connection; and means for adding prescribed portions of the outputs from said shift registers together to provide low-pass filter output.

14. A filter as set forth in claim 13 wherein said clocked delay lines are provided by respective read, then write random access memories each supplied a stream of addresses from an address generator comprising a counter of clock signals.

15. A filter as set forth in claim 13 wherein said means for adding prescribed portions of the outputs from said shift registers together includes:
a number of preliminary adders, each for adding together sampled data from points equidistant in said spatial field from the point stored in the $(p+1)^{st}$ storage of the $(n+1)^{st}$ shift register in said cascade connection;
a number of means for multiplying, one more than the number of adders, receiving as respective inputs the outputs of said preliminary adders and of the $(p+1)^{st}$ stage of the $(n+1)^{st}$ shift register in said cascade connection and providing outputs that equal those inputs multiplied by prescribed factors;
a final adder for summing the outputs of said means for multiplying to provide said low-pass filter output.

16. A filter as set forth in claim 15 wherein each said means for multiplying is a respective read only memory receiving as input the output of a respective preliminary adder, stores a fixed weighting coefficient, and supplies its output to said final adder as one of its inputs.

17. A filter as set forth in claim 15 wherein each said means for multiplying is a respective digital multiplier receiving as first input the output of a respective preliminary adder, receiving as second input a respective programmed weighting coefficient, and supplying its output to said final adder as one of its inputs; and wherein read only memory means supplies said programmed weighting coefficients from outputs thereof to the second inputs of said digital multipliers responsive to a bandwidth control signal applied as input there to.

18. A filter as set forth in claim 13 or 15 wherein p equals n.

19. A method of making the horizontal, vertical and diagonal resolutions of a base-band digital-television signal substantially the same, comprising the step of:
passing said base-band digital television signal through a two-dimensional spatial-frequency low-pass filter of the type set forth in claim 13, 15, or 16.

20. A method of reducing the diagonal resolution of a base-band digital television signal having equal horizontal and vertical resolutions smaller than said diagonal resolution, so that said diagonal resolution is made substantially the same as said horizontal and vertical resolution, said method comprising the step of:
passing said base-band digital television signal through a two-dimensional spatial-frequency low-pass filter having a circular-cylindric pass-band in the spatial-frequency domain.

21. Phantom raster generating apparatus comprising:
a field storage memory with storage locations addressed by column and by row conformally mapping the pixels in at least a portion of a display field for storing data descriptive of an image in said display field;
means for generating a phantom raster scan in first and second Cartesian coordinates by transformation including rotation from an x and y Cartesian coordinate description of raster scan proceeding pixel by pixel at relatively fast scan rate in the x direction and line by line at relatively slow scan rate in the y direction, each of said first and second Cartesian coordinates having a respective fractional portion or residue in addition to a respective integral portion or modulus, each or both of which residues at times may be zero-valued;
means for reading said memory, including
means for applying to said field storage memory, during each cycle of video scan, a pair of adjacent column addresses derived from the modulus of said first coordinate and a pair of adjacent row addresses derived from the modulus of said second coordinate, to develop successive samples of first, second, third and fourth data streams;
means for subtracting from successive data in said first data stream correspondingly timed data in said second data stream to obtain a fifth data stream;
means for multiplying successive data in said fifth data stream by the correspondingly timed residues of said first phantom-raster coordinate to obtain a sixth data stream;
means for adding successive data in said sixth data stream to correspondingly timed data in said second data stream to obtain a seventh data stream of first intermediate interpolation results;
means for subtracting from successive data in said third data stream correspondingly timed data in said fourth data stream to obtain an eighth data stream;
means for multiplying successive data in said eighth data stream to correspondingly timed residues of said first phantom-raster coordinate to obtain a ninth data stream;
means for adding successive data in said ninth data stream to correspondingly timed data in said fourth data stream to obtain a tenth data stream of second intermediate interpolation results;
means for subtracting from successive data in said seventh data stream correspondingly timed data in said tenth data stream to obtain an eleventh data stream;
means for multiplying successive data in said eleventh data stream by correspondingly timed residues of said second phantom-raster coordinate to obtain a twelfth data stream; and
means for adding successive data in said twelfth data stream to correspondingly timed data in said tenth data stream to obtain a thirteenth data stream of final interpolation results, forming a video signal descriptive of said image as read from said memory as scanned by said first and second phantom raster coordinates.

22. Phantom raster generating apparatus as set forth in claim 21 wherein said means for generating said phantom raster scan includes:
means responsive to a control signal for controlling the degree of rotation of the system of coordinates comprised by said first and second orthogonal coordinates respective to said x and y Cartesian coordinate system.

23. Phantom raster generating apparatus as set forth in claim 21 or 22 wherein said field storage memory is of a type in which the data stored in its storage locations can be electrically written, said phantom raster generating apparatus further including:
   means for addressing the columns of said field storage memory during its writing with x coordinates of raster scan and the rows of said field storage memory during its writing with y coordinates of raster scan; and
   means for applying digital video to said field storage memory as input during its writing, including a two-dimensional spatial-frequency low-pass filter.

24. Phantom raster generating apparatus as set forth in claim 23 wherein said two-dimensional spatial-frequency low-pass filter has a pass-band providing substantially the same resolution in all directions in said display field.

25. In combination:
   apparatus for generating a video signal descriptive of a television image scanned pixel-by-pixel and line-by-line, which video signal consists of a succession of samples describing the television signal with resolution in a direction diagonal to line scan which exceeds resolution in directions parallel to and perpendicular with the direction of line scan;
   sample storage means having a number of storage locations equal in number to the number of samples in a plurality of lines of said video signal;
   means for continuously rewriting locations in said sample storage means so they contain the most recent lines of samples in said video signal;
   means for reading from sample storing means the contents of storage locations describing localized portions of the original image;
   means for summing the samples thus read after weighting them to provide a linear-phase two-dimensional spatial frequency filter response with an elliptical-cylindric pass-band, the major and minor axes of its elliptic cross-section being aligned with ones of the direction of line scan and the direction perpendicular therewith, the diagonal resolution of which response is reduced without substantially reducing the resolutions in directions parallel to and perpendicular with said direction of line scan.

26. A combination as set forth in claim 25 wherein said elliptic cross-section is a circular cross-section.

27. A combination as set forth in claim 26 wherein said samples are weighted substantially in accordance with the first Bessel function of R divided by R, R being the distance of the sample from the center axis of a circle in the plane containing that circle, the projection of which circle defines the elliptic cross-section of the cylindric passband of said linear-phase two-dimensional spatial frequency filter response.

28. A combination as set forth in claim 25 in a further combination with the following elements;
   memory addressable in first and second orthogonal coordinates, for storing samples descriptive of an entire image field, said samples being supplied as the filter response of said means for weighting samples and summing the results;
   means for generating a scan of the address coordinates of that memory line-by-line in a first direction and pixel-by-pixel along each of those lines, when writing said samples into said memory;
   means for generating a scan of the address coordinates of that memory line-by-line in a second direction skewed with said first direction and pixel-by-pixel along each of those lines, when reading said samples out of said memory; and
   means responding to excess resolution in the scan of memory address coordinates for interpolating among adjacent samples in the memory, to provide a read-out from memory descriptive of a rotated television image free of aliasing caused by spatial bandwidth restrictions in said memory.

* * * * *